(12) United States Patent
Hiraguchi

(10) Patent No.: US 7,004,343 B2
(45) Date of Patent: Feb. 28, 2006

(54) HOLLOW CASE FOR MEDIA HAVING A BASE AND COVER

(75) Inventor: Kazuo Hiraguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 114 days.

(21) Appl. No.: 10/347,696

(22) Filed: Jan. 22, 2003

(65) Prior Publication Data

US 2003/0136695 A1 Jul. 24, 2003

(30) Foreign Application Priority Data

Jan. 23, 2002 (JP) ............................. 2002-013800

(51) Int. Cl.
*B65D 6/28* (2006.01)
(52) U.S. Cl. .................................................. 220/4.21
(58) Field of Classification Search ............... 220/4.21, 220/4.33, 799, 326, 324, 784, 780, 4.24; 242/348, 348.2; 360/132
See application file for complete search history.

(56) References Cited

U.S. PATENT DOCUMENTS

| | | | |
|---|---|---|---|
| 3,493,188 A * | 2/1970 | Krtous | 242/348 |
| 5,456,528 A | 10/1995 | Dalziel | |
| 5,533,642 A * | 7/1996 | Lafond et al. | 220/326 |
| 6,675,959 B1 * | 1/2004 | Chiang | 206/6 |

* cited by examiner

*Primary Examiner*—Stephen Castellano
(74) *Attorney, Agent, or Firm*—Sughrue Mion, PLLC

(57) ABSTRACT

A case for a recording tape cartridge is formed by joining an upper case and a lower case via mutual peripheral walls. A blocking piece, which is disposed to extend along the peripheral wall of the upper case serving as a cover, is inserted into a recess, which is disposed in the lower case serving as a base and opens upward and sideward, and a portion of the recess is blocked off by the blocking piece, whereby an engagement hole is formed that is positioned lower than a parting line (PL) and opens only sideward. According to the invention, it is possible to form a recess that opens only toward the outer surface of the peripheral wall of the base of the case, without disposing undercuts in the base.

23 Claims, 16 Drawing Sheets

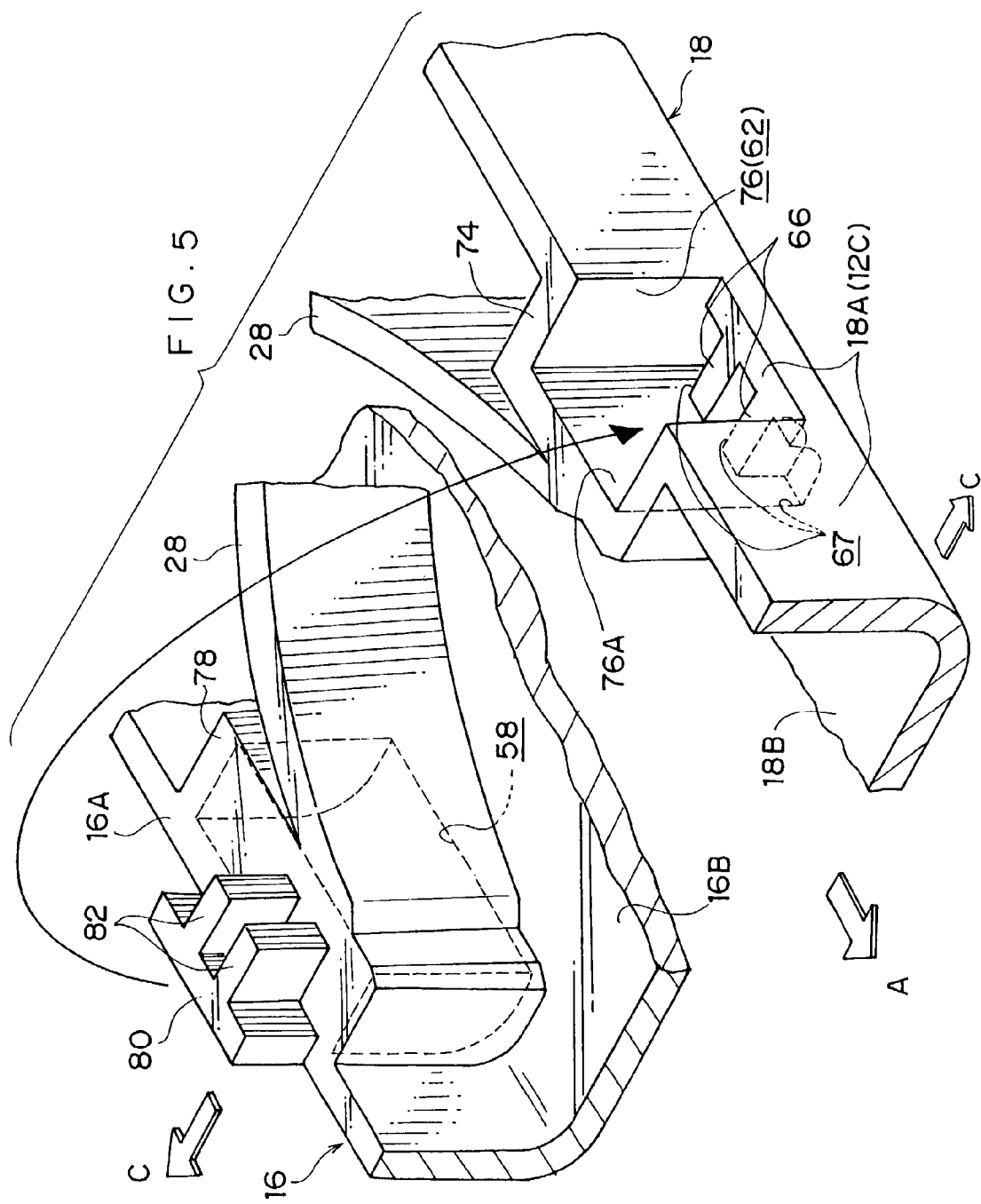

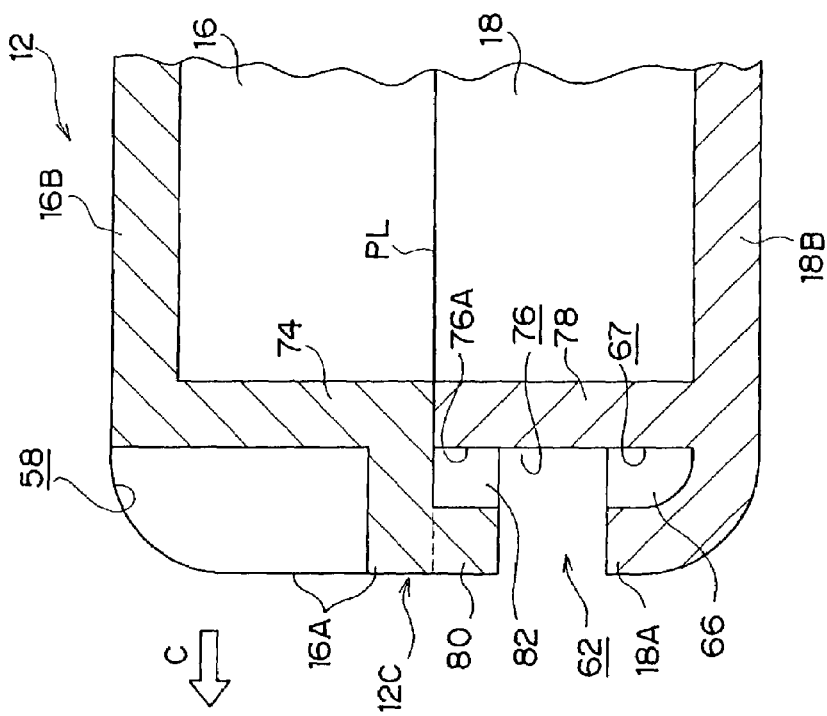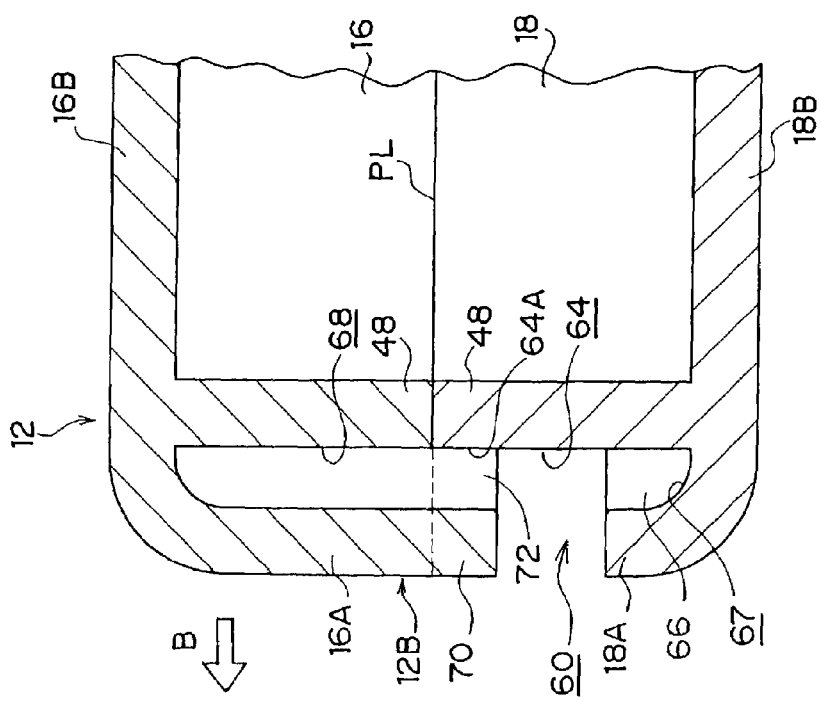

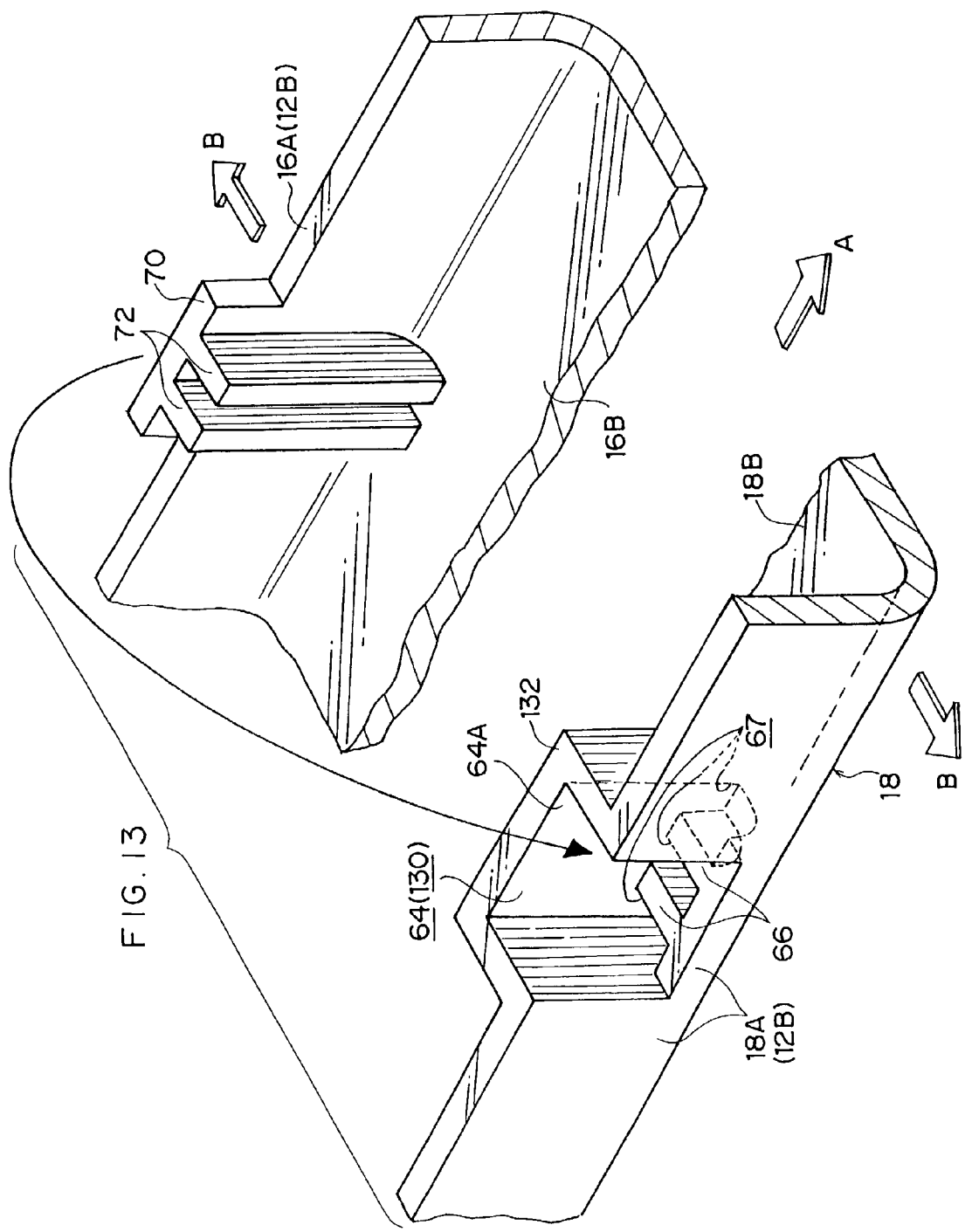

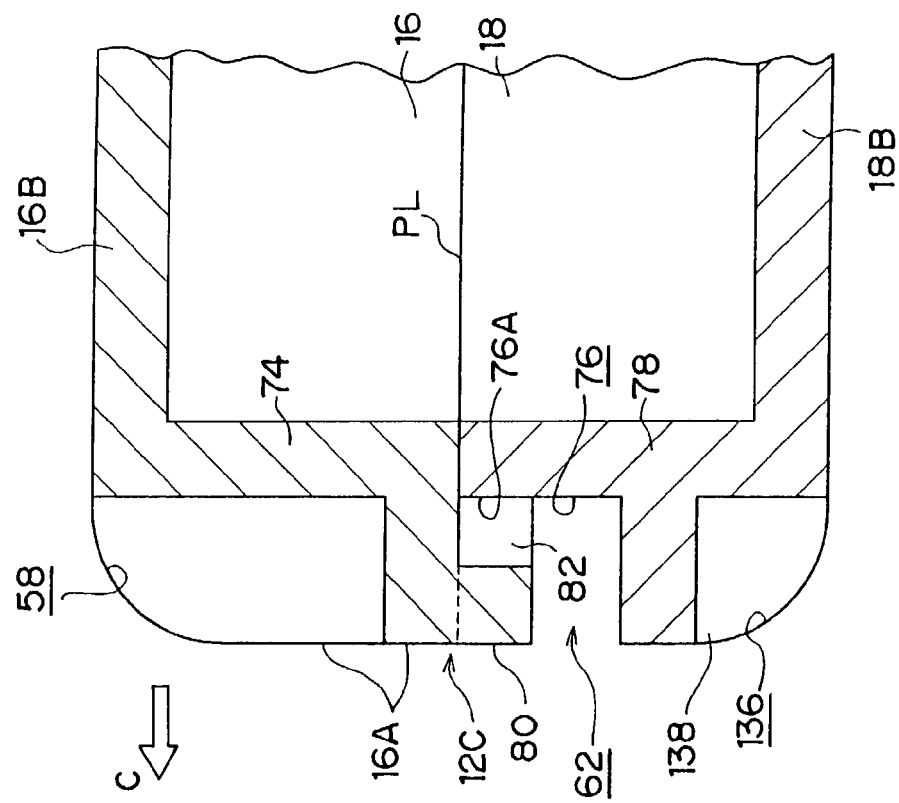
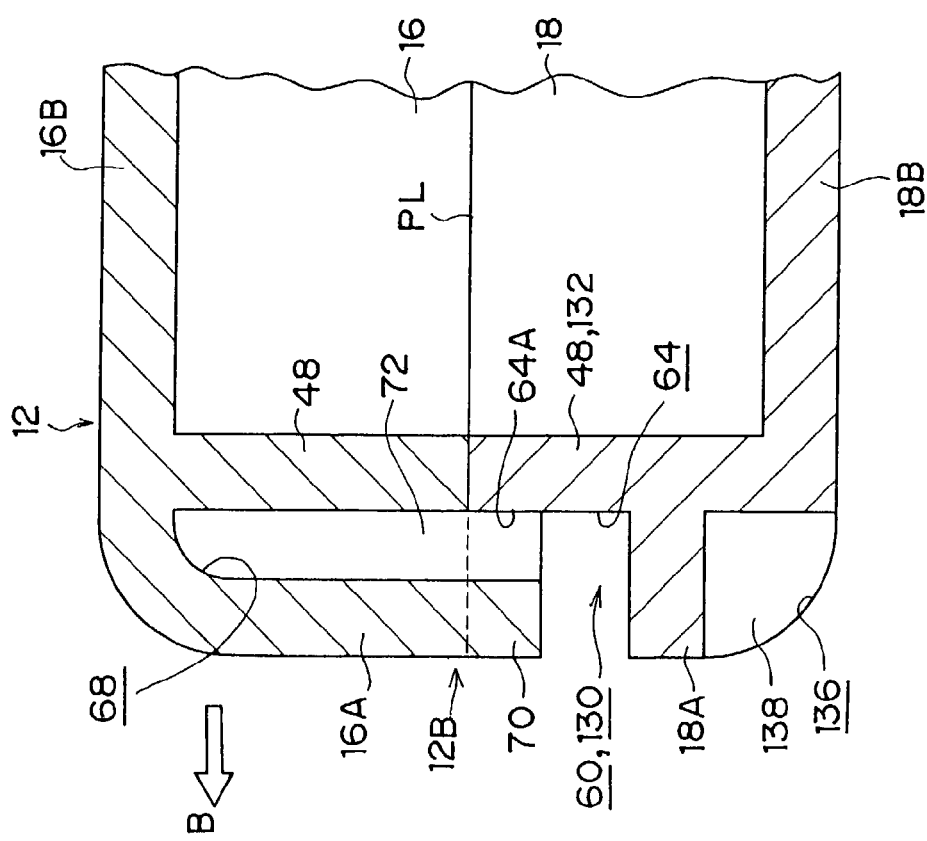

HOLLOW CASE FOR MEDIA HAVING A BASE AND COVER

BACKGROUND OF THE INVENTION

1. Field of the Invention

The present invention relates to a case that houses, for example, a disc medium or a reel around which recording tape such as magnetic tape is wound.

2. Description of the Related Art

Recording tape such as magnetic tape is used as an external recording medium for computers and the like to back up information. A recording tape cartridge, which houses within a case a single reel around which is wound recording tape whose housing space during storage is small and on which a large volume of information can be recorded, is employed.

In the recording tape cartridge, the single reel, around which is wound the recording tape, is rotatably accommodated within the case, which is formed by joining an upper case that serves as a base or a cover with a lower case that serves as a cover or a base, with both the upper case and the lower case being made of a resin material. An opening, which is opened and closed off by a door and through which the recording tape is pulled out, is formed in the case.

When the recording tape cartridge is to be used, the recording tape cartridge is loaded into a drive device, and within the drive device, the door is operated, the opening is opened, and the recording tape cartridge is precisely positioned. In this state, recording and playback of information is carried out as the recording tape is pulled out from the case and taken up at a take-up reel in the drive device.

In large-scale backup systems, the recording tape cartridge is generally used in a library device that houses plural recording tape cartridges and automatically (without the intervention of human hands) loads the recording tape cartridges into and removes the recording tape cartridges from the drive device. In such a library device, the recording tape cartridges are housed in a state in which they are respectively positioned in holders, and when the recording tape cartridges are to be used, the recording tape cartridges are conveyed and loaded into the drive device while being held by, for example, a chucking mechanism. After being used, the recording tape cartridges are conveyed and housed in the holders while being held by the chucking mechanism.

In the recording tape cartridge described above, plural recesses or bottomed holes (referred to below as recesses) are disposed in the case in order for the recording tape cartridge to be positioned (i.e., subjected to regulation of orientation thereof) in the drive device and in the holder, and in order for the recording tape cartridge to be reliably held by the chucking mechanism. The directions in which the recesses open, the dimensional shape of the recesses, and the positions at which the recesses are disposed respectively differ depending on their function (purpose for which they are used).

On the other hand, in drive devices and library devices, there are instances where the ways in which the recording tape cartridge is positioned, held, and conveyed differ depending on the model and specifications of the devices. Therefore, it becomes necessary to dispose more recesses in the case in order for the recording tape cartridge to be adapted and adequately accommodated by such plural types (specifications) of drive devices and library devices. Also, in order to prevent mistaken use of the recesses (e.g., the occurrence of a state where positioning members or conveyance rollers of a non-corresponding library device are inserted into the recesses and obstruct correct operation), it may be necessary, depending on the recesses, that the directions in which the recesses open, the dimensional shape of the recesses, and the positions at which the recesses are disposed are regulated according to their relation with other recesses.

There are also instances where recesses or bottomed holes, whose being opened at an outer surface of the case is not allowed and thus which open only to the side of the case (to an outer surface of a peripheral wall of the case), are disposed. In these instances, as long as the recesses are formed by joining an upper recess, which is disposed in a peripheral wall of the upper case and opens sideward and downward, with a lower recess, which is disposed in a peripheral wall of the lower case and opens sideward and upward, there arise no problems when the upper case and the lower case are removed from molds at the time of molding. However, when the recess is not disposed at the attaching wall of the upper/lower case at which the upper case is attached to the lower case, i.e., when the recess is positioned distanced from the attaching walls of the upper and lower cases, there arises a problem.

Namely, when recesses that open only sideward are to be disposed in the peripheral wall of the lower case serving as the base, it is necessary to use a slide core when molding the recesses because undercuts are to be formed in the lower case, which results in the mold structure becoming complicated and costs becoming high.

There arise similar problems when recesses that open only in the outer surface of the peripheral wall are to be disposed with respect to cases in general that are formed by joining the cover to an open end of the peripheral wall of the base, such as cases for two-reel recording tape cartridges disposed with a reel for winding off the magnetic tape and a reel for taking up the magnetic tape, and cases for disc cartridges that rotatably house disc media.

SUMMARY OF THE INVENTION

In consideration of the aforementioned facts, it is an object of the present invention to provide a case of a structure in which can be formed a recess that is disposed away from a site where a cover is joined to a peripheral wall of a base and that opens only to an outer surface of the peripheral wall, without disposing undercuts in the base.

In order to achieve this object, a case of the present invention is a hollow case formed by a cover being joined to an open end of a peripheral wall of a base formed in a bottomed container shape, the case including: a recess that is disposed in the peripheral wall of the base and opens to an outer surface of the peripheral wall and the open end; and a blocking portion that is projectingly disposed at the juncture between the cover and the base and inserted into the recess to thereby block off a portion of the recess.

The case of the invention is formed hollow by the cover being joined to the open end of the peripheral wall of the base formed in a bottomed container shape. Due to this joining, the blocking portion projecting from and connected to the joined side of the cover is inserted into the recess of the base.

Thus, the blocking portion blocks off a portion of the recess, and a recess (bottomed hole) that opens only to the outer surface (side of the case) of the peripheral wall of the case is formed. In other words, a recess is formed that opens only to the side of the case and is positioned away from a juncture site (parting line) between the base and the cover.

Because the recess disposed in the base also opens to the open end side (juncture with the cover), i.e., because the recess can be formed by removing the mold from the open end side, the base disposed with the recess can be formed without providing undercuts and without using slide cores.

In this manner, according to the invention, the recess that is disposed away from the site where the cover is joined to the peripheral wall of the base and that opens only to an outer surface of the peripheral wall can be formed without providing undercuts in the base.

Also, because the blocking portion disposed at the cover blocks off a portion of the recess, it is possible to dispose the recess (bottomed hole) opening only to the side of the case at a desired dimensional shape in a desired position. In addition, it is possible to alter the opening width and the opening height (the positions with respect to predetermined references) of the recess by altering the shape of the blocking portion (i.e., by altering the mold for forming the cover).

As an example to which the structure of the case is applied, a recording media cartridge can comprise a structure including: a case that is formed by fitting together mutual peripheral walls of an upper case and a lower case to thereby join the upper case with the lower case and that rotatably houses a disc medium or a reel around which is wound recording tape; a recess that is disposed at the peripheral wall of one of the upper case and the lower case and opens to both an outer surface of the peripheral wall and the juncture site between the upper case and the lower case; and a blocking portion that is disposed to extend along the peripheral wall of the other of the upper case and the lower case and is inserted into the recess to thereby block off a portion of the recess.

In a recording media cartridge of this structure, one of the upper case and the lower case corresponds to the aforementioned "base", and the other of the upper case and the lower case corresponds to the aforementioned "cover". The upper case and the lower case are joined by fitting together their mutual peripheral walls (open ends) from above and below the disc medium or the reel wound with the recording tape, and a reel is housed in the case.

Due to this joining, the blocking portion extending along the peripheral wall of the other of the upper case and the lower case is inserted into the recess formed at one of the upper case and the lower case, through the portion of the recess opened to the juncture site between the upper case and the lower case. Thus, the blocking portion blocks off a portion of the recess, and a recess (bottomed hole) that opens only to the outer surface (side of the case) of the peripheral wall of the case is formed. In other words, a recess is formed that opens only to the side of the case and is positioned at one side of the upper case and the lower case with respect to a juncture site (parting line) between the upper case and the lower case.

Because the recess disposed at one of the upper case and the lower case also opens to the juncture (side) with the other of the upper case and the lower case, the one of the upper case and the lower case disposed with the recess can be formed without including undercuts and without using slide cores. In this manner, in the recording media cartridge of the structure of the present invention, the recess that opens only to the side of the case and is positioned at one side of the juncture between the upper case and the lower case can be formed without disposing undercuts.

In the case or the recording media cartridge of the above-described structures, ribs that abut against a bottom surface of the recess facing the case side may be disposed at an inner surface of the blocking portion. In this structure, because the ribs abut against the bottom surface of the recess, the strength of the case is secured. This structure is particularly useful when the depth of the recess from the peripheral wall outer surface to the bottom surface is greater than the plate thickness of the peripheral wall. Moreover, because there is no need to thicken the blocking portion in order to secure the strength of the case, sink marks that may be formed when the blocking portion is thickened are prevented from being formed in the blocking portion outer surface (design surface of the case).

Moreover, when the case is structured such that weight-reducing sections (sections where portions of the wall have been removed for weight reduction) are disposed in a portion of the recess around a bottom facing the juncture site, there is no need to thicken the portion (bottom panel and peripheral wall of the base) around the recess dependent on the position and depth of the recess, and there is also no need to dispose undercuts at the inner side of the base (case). For this reason, a recess (bottomed hole) of a desired depth at a desired position in the vertical direction of the case can be provided without sink marks arising in the outer surface of the case and without making the mold structure complicated.

Also, when the case is structured such that the blocking portion is fitted into the recess (i.e., so that the gap between the recess and the blocking portion is small), deformation of the case, such as twisting, is suppressed by the recess and the blocking piece mutually interfering, and thus gaps in the juncture site between the base and the cover are suppressed, even if a shock is applied to the case due to the case being dropped or the like. In particular, in a structure in which the blocking portion or the ribs disposed at the blocking portion abut against the bottom surface of the recess facing the case side, portions that mutually interfere when the case is dropped or the like are increased and generation of gaps in the juncture site resulting from the case being dropped or the like are further suppressed.

BRIEF DESCRIPTION OF THE DRAWINGS

FIG. 5 is an exploded perspective view showing a blocking piece and a recess forming a left-side engagement hole in the recording tape cartridge to which the structure of the case according to the embodiment of the invention has been applied;

FIGS. 6A and 6B are views of the engagement holes of the recording tape cartridge to which the structure of the case according to the embodiment of the invention has been applied, with FIG. 6A being a cross sectional view showing the right-side engagement hole and FIG. 6B being a cross sectional view showing the left-side engagement hole;

FIG. 13 is an exploded perspective view showing a blocking piece and a recess forming an engagement hole according to a modified example of the recording tape cartridge to which the structure of the case according to the embodiment of the invention has been applied;

FIGS. 16A and 16B are views showing an engagement hole to which has been applied the modified example of the weight-reducing structure of the lower case of the recording tape cartridge to which the structure of the case according to the embodiment of the invention has been applied, with FIG. 16A being a cross sectional view showing the right-side engagement hole and FIG. 16B being a cross sectional view showing the left-side engagement hole.

DESCRIPTION OF THE PREFERRED EMBODIMENTS

Figure 1:
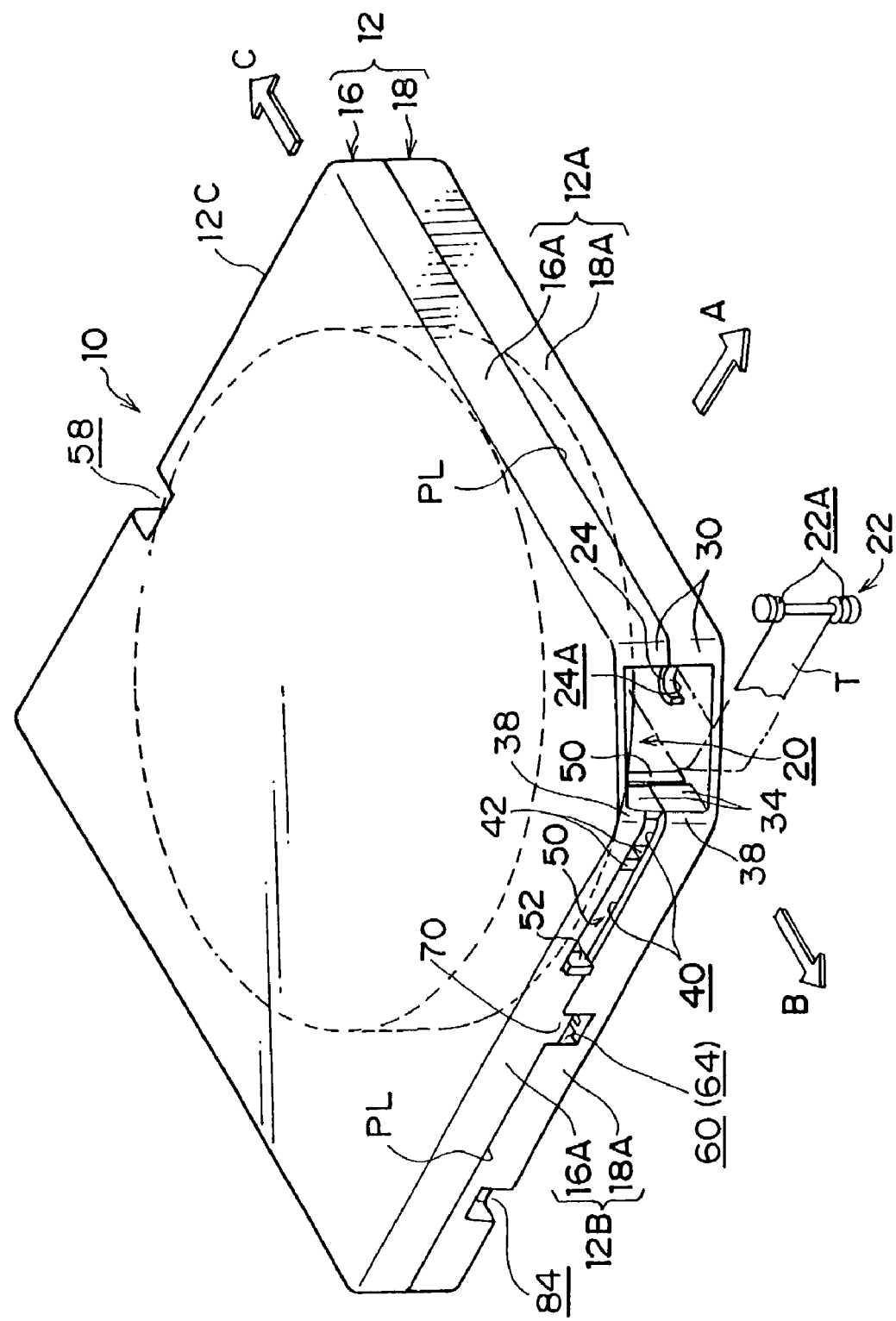
FIG. 1 is a perspective view showing the overall structure of a recording tape cartridge to which the structure of the case according to an embodiment of the invention has been applied.
Figure 2:
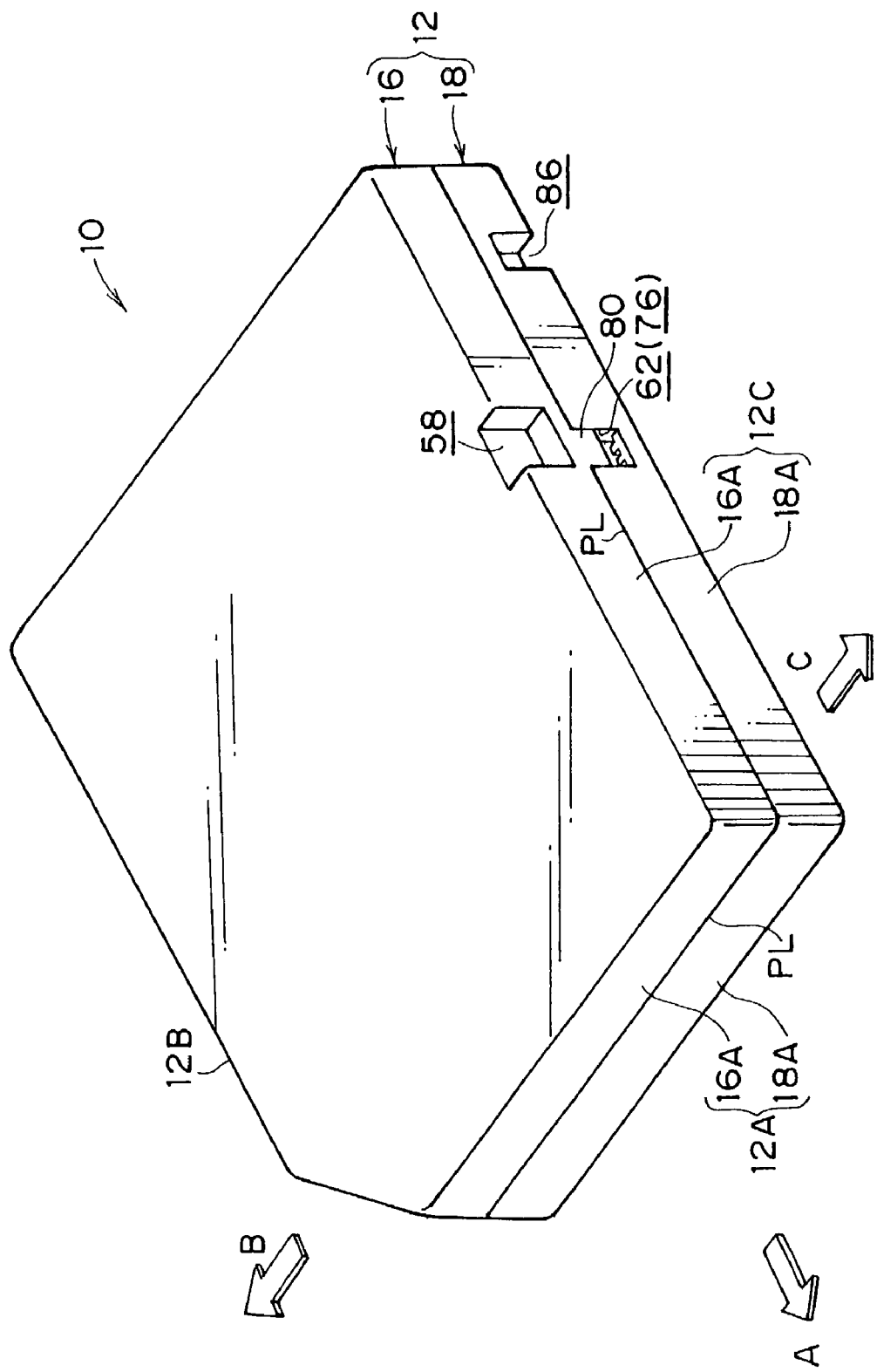
FIG. 2 is a perspective view, seen from a different direction, showing the overall structure of a recording tape cartridge to which the structure of the case according to the embodiment of the invention has been applied.
Figure 3:
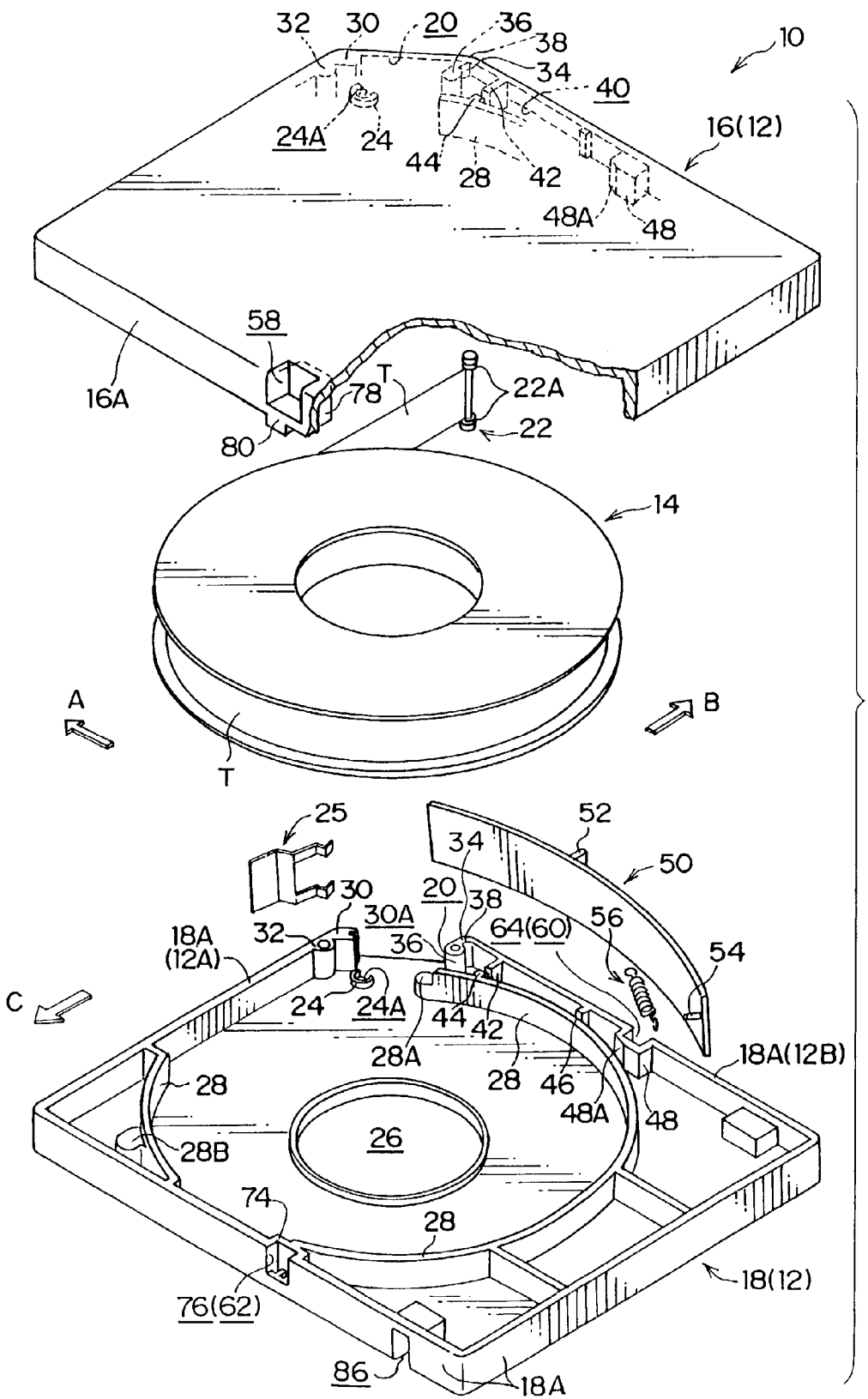
FIG. 3 is an exploded perspective view of the recording tape cartridge to which the structure of the case according to the embodiment of the invention has been applied.

A recording tape cartridge 10, to which the structure of a case according to an embodiment of the invention has been applied, will be described on the basis of FIGS. 1 through FIGS. 7A to 7C. First, the overall schematic structure of the recording tape cartridge 10 will be described, and then engagement holes 60 and 62, which are formed by recesses 64 and 76 and blocking pieces 70 and 80 that are the main parts of the invention, will be described.

For convenience of explanation, the direction in which the recording tape cartridge 10 is loaded into a drive device, which direction is indicated by arrow A, will be referred to as the front direction (front side) of the recording tape cartridge 10, and the directions of arrow B and arrow C, which are orthogonal to arrow A, will be respectively referred to as the right direction and the left direction.

(Overall Structure of Recording Tape Cartridge)

As shown in these drawings, the recording tape cartridge 10 includes a case 12, which is substantially rectangular in plan view, and a single reel 14 which is rotatably housed in the case 12 and around which is wound magnetic tape T that serves as recording tape and is a medium for recording and playing back information.

The case 12 is formed by joining an upper case 16 and a lower case 18 by fitting together mutual peripheral walls 16A and 18A. The front right corner of each of the upper case 16 and the lower case 18, which front right corner is a corner at a head side in the direction in which the recording tape cartridge 10 is loaded into the drive device, is cut out. A housing space for accommodating the reel 14, around which the magnetic tape T is wound, is disposed within the case 12. The front right corner, from which a top panel 16B and a bottom panel 18B and the peripheral walls 16A and 18A of the upper case 16 and the lower case 18 have been cut out, serves as an opening 20 through which the magnetic tape T is pulled out.

A lead pin 22, which is operatively pulled out as it is locked (engaged) by pull-out means of the drive device, is connected to a free end of the magnetic tape T that is pulled out through the opening 20. An annular groove 22A is formed at each end of the lead pin 22, which ends of the lead pin 22 protrude from width-direction edges of the magnetic tape T. The annular grooves 22A are locked by hooks or the like of the pull-out means. Thus, when the magnetic tape T is pulled out, the hooks do not contact and damage the magnetic tape T.

A pair of upper and lower pin holders 24 that position and retain the lead pin 22 inside the case 12 is disposed inside the opening 20 of the case 12. The pin holders 24 have a semi-cylindrical shape, and the ends of the lead pin 22 are retained in recesses 24A in the pin holders 24 in a state in which the lead pin 22 is vertically disposed therein. Outer peripheral walls of the pin holders 24 at the side at which the magnetic tape T is pulled out open and form a gateway through which the lead pin 22 can enter and exit.

A plate spring 25 is fixedly disposed near the pin holders 24. The plate spring 25 engages the upper and lower ends of the lead pin 22 and retains the lead pin 22 in the pin holders 24. When the lead pin 22 enters and exits the pin holders 24, the plate spring 25 elastically deforms to allow the movement of the lead pin 22.

A gear opening 26 for exposing a reel gear (not illustrated) of the reel 14 to the outside is disposed in the center of the bottom panel 18B of the lower case 18. The reel gear meshes with a drive gear of the drive device, whereby the reel 14 is rotatably moved within the case 12. The reel 14 is retained by free movement-regulating walls 28 that are mutually symmetrical, vertically disposed on inner surfaces of the top panel 16B of the upper case 16 and on the bottom panel 18B of the lower case 18, and serve as an inner wall (in the shape of a short cylinder from which a portion has been cut away)

located on a circular locus that is concentric with the gear opening 26, so that the reel 14 does not chatter. The free movement-regulating wall 28 is cut away (stop) near the opening 20.

A pocket 28A, within which is formed a hole for positional regulation, is disposed at an end of the free movement-regulating wall 28 near the opening 20. Also, a pocket 28B, at which is formed a long hole for positional regulation, is disposed at the free movement-regulating wall 28 at an inner side of the front left corner of the case 12. The pockets 28A and 28B are disposed on a straight line along the left-right (arrows B and C) direction.

A pair of short upper and lower slanted walls 30 that define a front edge of the opening 20 is disposed at a right end of a front wall 12A (a portion of the peripheral walls 16A and 18A whose outer surface faces the direction of arrow A) of the case 12. The slanted walls 30 curve along a free surface of the opening 20 and are made thicker than the front wall 12A. A recess 30A, into which is inserted a leading end of a door 50 (described later), is formed in a thickness-direction center of the slanted walls 30. A pair of upper and lower screw bosses 32 is connectedly disposed at an inner side of the front wall 12A in a leftward vicinity of the slanted walls 30.

A pair of upper and lower curved walls 34 that extend inward and orthogonal to the direction of arrow A is connectedly disposed at a front end of a right wall 12B (the right-side wall along the direction of arrow A of the peripheral walls 16A and 18A) of the case 12. A pair of upper and lower screw bosses 36 is opposingly disposed at leading edges of the curved walls 34, and outer peripheral portions of the screw bosses 36 also function to guide a slideable door 50 so that the door is prevented from chattering. The portions at which the curved walls 34 and the right wall 12B are connected form a pair of upper and lower slanted steps 38 that are slanted along the free surface of the opening 20.

A slit 40 of predetermined length that serves as a window through which the outside of the case 12 communicates with the inside of the case 12 is disposed in the right wall 12B behind the curved wall 34, and serves to expose an operational projection 52 (described later) of the door 50. The slit 40 is formed by cutting out a lower portion of the peripheral wall 16A of the right wall 12B, and also opens frontward by cutting out a lower portion of the slanted wall 38 of the upper case 16. That is, a lower end of the slit 40 is defined by the peripheral wall 18A of the lower case 18 and an upper end surface of the slanted wall 38. Thus, the slit 40 is positioned above a parting line PL, which is a juncture between the upper case 16 and the lower case 18, corresponds to a cell retention notch 58 (described later) that is positioned above the parting line PL, and is incapable of being entered by a drive roller 122 described later.

A pair of upper and lower protrusions 42 that protrude toward the inside (leftward) of the case 12 is connectedly disposed along an overall height of the right wall 12B behind the curved wall 34 (i.e., at the front portion of the slit 40). End surfaces of the protrusions 42 curve in correspondence to an outer surface of the door 50 described later. Protrusions 44, which respectively curve in correspondence to an inner surface of the door 50 and face the protrusions 42, are disposed along an overall height at positions corresponding to the upper and lower protrusions 42 of the free movement-regulating wall 28. The protrusions 42 and the protrusions 44 sandwich the door 50 so that the door 50 can slide against them when the door 50 opens and closes off the opening 20.

The protrusions 42 and the protrusions 44 are for preventing dust from infiltrating the case 12 and for guiding the door 50 (chatter prevention).

Additionally, protrusions 46 that protrude toward the inside of the case 12 are also disposed along the overall height of a portion of the right wall 12B (of peripheral walls 16A and 18A) defining the rear end of the slit 40. The protrusions 46 are for preventing dust from infiltrating the case 12 and for guiding the door 50 (for preventing the door 50 from chattering). Furthermore, a pair of upper and lower protrusions 48, which protrude toward the inside of the case 12 and are for forming an engagement hole 60 described later, is disposed along the overall height behind the protrusions 46 in the case 12. A portion in each protrusion 48 that curves in correspondence to the outer surface of the door 50 forms a guiding surface 48A which guides the door 50 (for chatter prevention) and against which the outer surface of the door 50 can slide when the door 50 opens and closes off the opening 20.

The peripheral wall 16A and the peripheral wall 18A are of the same height and are joined by fitting together their mutual open ends, whereby the upper case 16 is attached to the lower case 18. In this state, screws (not illustrated) are screwed from below into the screw bosses 32 and 36 positioned near the edges of the joined opening 20 and into other screw bosses (not illustrated) disposed at appropriate positions in the case 12, whereby the upper case 16 and the lower case 18 are fixed (joining is maintained) and the hollow case 12 is formed. Thus, corners at both ends of the opening 20 are firmly joined, and a sufficiently high drop test number is reliably obtained. It should be noted that the upper case 16 and the lower case 18 may be fixed by fitting together fitting holes and protrusions respectively disposed at positions corresponding to the screw bosses 32 and 36 and fixing the upper case 16 and the lower case 18 with screws at other portions. The part at which the peripheral walls 16A and 18A abut against each other (juncture) can be welded and fixed by ultrasonic welding.

The angle at which the free surface of the opening 20 is slanted with respect to the direction of arrow A (the angle at which the bottom panel 18B and the top panel 16B of the case 12 that define the top and bottom of the opening 20 are slanted with respect to the direction of arrow A) is determined according to the demand to identify (recognize) the recording tape cartridges 10 in the library device 90 described later. In response to the aforementioned angle (or depending on the presence or absence of slanting), the library device 90 can recognize the recording capacity and generation of the recording tape cartridges 10.

The above-described opening 20 in the case 12 is opened and closed off by the door 50, which serves as a shielding member. The plate width (height) of the door 50 is substantially the same as the opened height of the opening 20, and the plate length of the door 50 is sufficiently larger than the opened width of the opening 20. When seen in plan view, the door 50 is formed in a circular arc that curves in a plate thickness direction along a predetermined circumference.

Figure 7A:
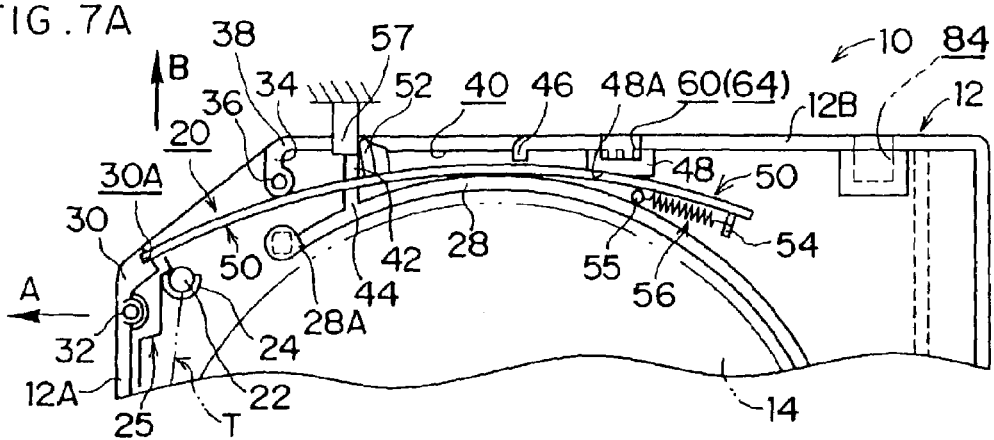
FIGS. 7A to 7C are views, seen when an upper case has been removed, showing an opening procedure of an opening in the recording tape cartridge to which the structure of the case according to the embodiment of the invention has been applied, with FIG. 7A being a plan view showing an initial state where an open/close member of a drive device engages with an operational protrusion of a door, FIG. 7B being a plan view showing the opening being opened, and FIG. 7C being a plan view showing a state where the opening has been completely opened.
Figure 7B:
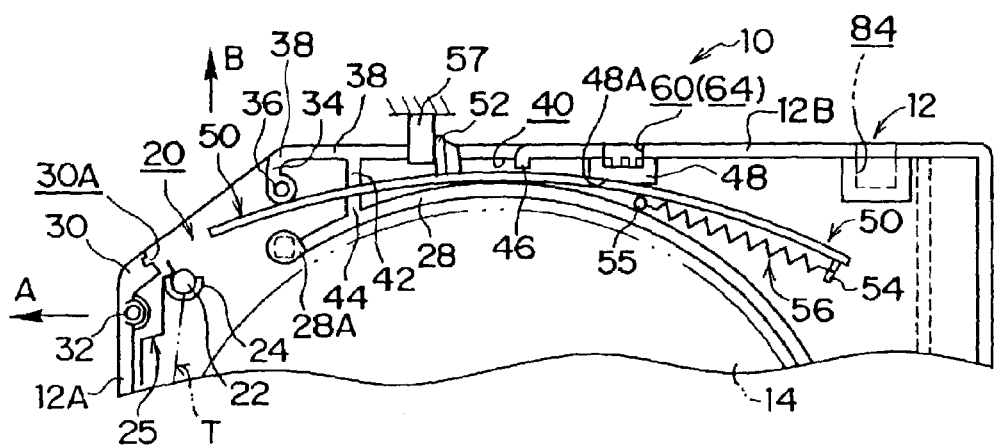
Figure 7C:
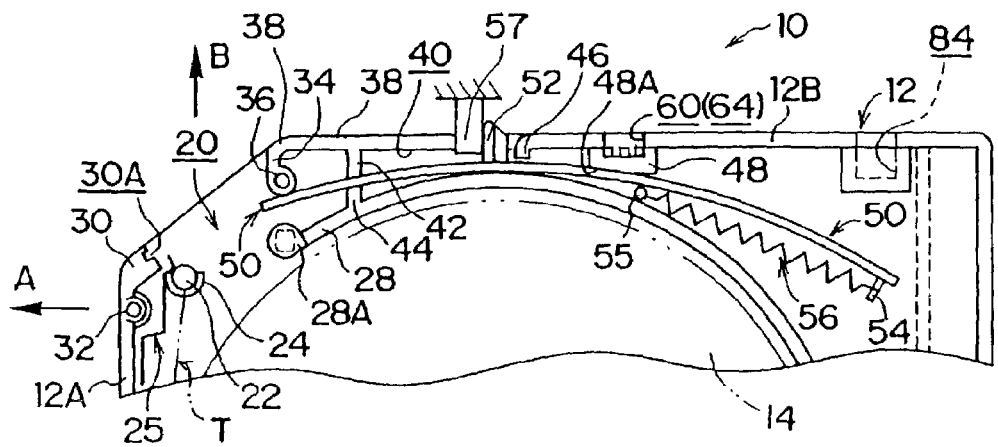

Specifically, the door 50 closes off the opening 20 in a state in which the leading edge of the door 50 has been inserted into the recess 30A of the slanted wall 30 (see FIG. 7A), opens up the opening 20 by moving (rotating) substantially rearward along the aforementioned circumference (see FIG. 7B), and completely opens up the opening 20 when the outer peripheral surface near the leading edge of the door 50 reaches the vicinity of the screw boss 36 (see FIG. 7C). The door 50 closes off the opening 20 by rotating in the direction substantially opposite to the direction in which it rotates when opening up the opening 20.

That is, the door 50 is curved in a circular arc corresponding to the predetermined circumference that is the locus of its movement. The rotational center of the door 50 is set, in the present embodiment, so that the center is located near the left end of the case 12 in the left-right direction and near the rear end of the slit 40 in the front-rear direction. It should be noted that the radius and rotational center of the door 50 can be appropriately determined in accordance with the angle of the free surface of the opening 20 determined by the demand from the library device and the position of the front-rear edges (slanted wall 30 and screw boss 36) of the opening 20 determined by the demand from the drive device.

The curved longitudinal dimension of the door 50 is determined so that the rear end of the door 50 is positioned within the right rear corner behind the recess 48 of the case 12 in a state in which the opening 20 is closed off. Thus, the door 50 is guided (chattering is suppressed) by the screw bosses 36, the protrusions 42, 44, and 46, and the guiding surface 48A (and the free movement-regulating wall 28) of the case 12 during the entire process of opening and closing off the opening 20.

The operational projection 52 that serves as an operating part is disposed at the outer periphery of the door 50 slightly in front of a longitudinal-direction center thereof, and protrudes along the radial direction of the door 50. The operational projection 52 is exposed to the outer side of the case 12 through the slit 40, is positioned slightly away from and behind the protrusions 42 in a state in which the opening 20 is closed off, and is operable from a portion that opens frontward at the slanted steps 38 of the slit 40. Each dimension is determined so that a leading end of the operational projection 52 does not protrude further than the outer surface (outside region of the case 12) of the right wall 12B in this state.

In a state in which the opening 20 is opened, the operational projection 52 is positioned slightly away from and in front of the protrusions 46 positioned at the rear edge of the slit 40. It should be noted that, in this state, each dimension is determined so that the longitudinal direction of the operational projection 52 is substantially orthogonal to the right wall 12B (direction of arrow A) of the case 12.

The inside of the case 12 communicates with the outside of the case 12 through the slit 40 for exposing the operational projection 52. Due to the fact that the slit 40 is ordinarily substantially closed off by the door 50 that spans substantially the overall height of the case 12 and by the protrusions 42 and 46 that guide the door 50, and due to the fact that a labyrinthine structure is formed between the slit 40 and the housing space of the reel 14 by the free movement-regulating wall 28 serving as the inner wall and the protrusions 44 that guide the door 50, dust is prevented from adhering to the magnetic tape T wound around the reel 14.

A spring retainer 54 is disposed at the inner periphery near the rear end of the door 50 and protrudes along the radial direction of the door 50. One end of a coil spring 56, which functions as urging means, is locked and retained at the spring retainer 54, and another end of the coil spring 56 is locked at a spring lock 55 disposed upright from the bottom panel 18B of the lower case 18. Thus, the door 50 is urged by an urging force of the coil spring 56 in the direction in which the opening 20 is closed off, so that the opening 20 is ordinarily closed off.

The above-described door 10 has a structure in which, due to an action by which the recording tape cartridge 10 is loaded into the drive device along the direction of arrow A, as shown in FIGS. 7A to 7C, the operational projection 52 engages with an open/close member 57, which is fixed to the drive device and enters from a portion of the slit 40 that opens at front, whereby the door 50 is moved counter to the urging force of the coil spring 56 and opens the opening 20, and closes off the opening 20 due to the urging force of the coil spring 56 when the recording tape cartridge 10 is ejected from the drive device. Also, the door 50, which is formed so as to curve in a circular arc shape, rotates so as to move around the reel 14 and outer sides of the pin holders 24 (lead pin 22), without sticking out from the movement locus along that curved shape, when the door 50 opens/closes the opening 20.

The recessed cell retention notch 58 is disposed at the front-rear direction substantial center portion in the left end of the case 12. The cell retention notch 58 engages with an engagement member of the drive device when the opening 20 is opened, whereby the rotational moment acting around the site where the operational projection 52 and the open/close member 57 are engaged is canceled out. Thus, the case 12 is loaded into the drive device without slanting with respect to the direction of arrow A, the door acts smoothly, and the opening 20 is opened.

It should be noted that the door 50 is not limited to a structure guided by the protrusions 42 and 44. The door 50 may be configured so that it is guided by pairs of upper and lower grooves and guide ribs (including ribs that are disposed continuously and within which grooves are formed) disposed at the top panel 16B and the bottom panel 18B.

(Structure of Engagement Holes)

A pair of left and right engagement holes 60 and 62 is disposed in the case 12. The engagement holes 60 and 62 are recesses (bottomed holes) within which engagement pawls 110 are inserted for retaining the recording tape cartridge 10 inside the holder 92, in a state in which the recording tape cartridge 10 is housed in the holder 92 (described later) of the library device 90.

Figure 4:
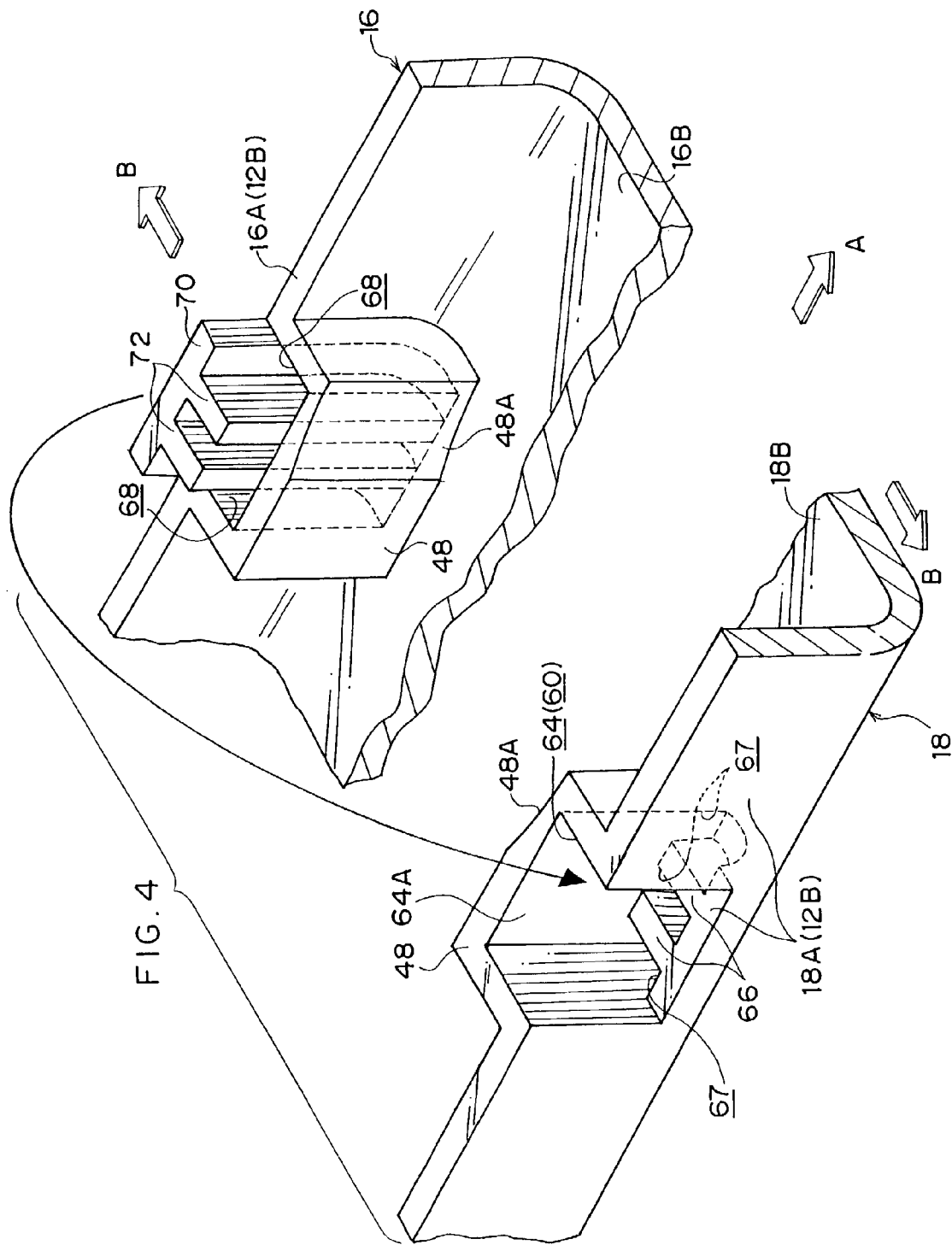
FIG. 4 is an exploded perspective view showing a blocking piece and a recess forming a right-side engagement hole in the recording tape cartridge to which the structure of the case according to the embodiment of the invention has been applied.

As shown in FIG. 4, the recess 64, which opens rightward (toward the outer surface of the right wall 12B) and upward (open end side), is disposed at an outer side of the protrusion 48, which is disposed substantially at the front-rear direction center of the lower case 18 and on which is formed a guide surface 48A. The bottom of the recess 64 is regulated by plural (two in the present embodiment) ribs 66 and the peripheral wall 18A forming the right wall 12B.

Each rib 66 spans the distance from an inner edge of the peripheral wall 18A to a side bottom surface (left edge) 64A of the recess 64. A weight-reducing section 67 is formed between the ribs 66 themselves and between the ribs 66 and front and rear walls of the recess 64. The thickness of each rib 66 is set to be equal to or less than the plate thickness of the peripheral wall 18A. The number of ribs 66 is appropriately determined according to the opening width (opening length in the front-rear direction of the case 12) of the recess 64.

Weight-reducing holes 68 that open downward are disposed at positions corresponding to the recess 64 in the protrusion 48 of the upper case 16. The opening width of the weight-reducing holes 68 corresponds to the opening width of the recess 64, and the left (deep) side inner edge position of the weight-reducing holes 68 corresponds to the side bottom surface 64A of the recess 64. Bottoms of the weight-reducing holes 68 are defined by the top panel 16B.

A blocking piece 70, which serves as a blocking part extending downward along the peripheral wall 16A defining the right-side edges of the weight-reducing holes 68, is disposed at the upper case 16. The width of the blocking piece 70 corresponds to the opening width of the recess 64, and the height at which the blocking piece protrudes from the peripheral wall 16A is smaller than the opening height of the recess 64. When the blocking piece 70 is inserted into the recess 64, the upper portion of (i.e., part of) the recess 64 is blocked off.

Plural (two in the present embodiment) ribs 72, whose height spans the distance from the bottoms of the weight-reducing holes 68 (i.e., the top panel 16B) to the lower end of the blocking piece 70, are disposed at the blocking piece 70 and at the portion of the peripheral wall 16A where the blocking piece 70 is disposed, so as to protrude leftward (toward the inside of the case 12). Left end surfaces of each rib 72 correspond to the left-side edges of the weight-reducing holes 68, and abut against the side bottom surface 64A of the recess 64 in a state in which the blocking piece 70 has been inserted into the recess 64. Thus, the strength of the blocking piece 70, whose lower end does not abut against the lower case 18, is secured.

As described above, when the upper case 16 and the lower case 18 are joined together and fixed by the screws, the peripheral wall 16A and the peripheral wall 18A abut against each other, and the upper and lower protrusions 48 abut against each other. Also, as shown in FIG. 6A, the bottomed engagement hole 60, which opens only toward the outer surface (rightward, sideward) of the right wall 12B, is formed lower than the portion (parting line PL) at which the peripheral wall 16A and the peripheral wall 18A abut, due to the fact that upper portion of the recess is blocked off by the blocking piece 70 being inserted into the recess 64. That is, the lower end of the blocking piece 70 inserted into the recess 64 defines the upper edge of the engagement hole 60.

Also, as shown in FIG. 5, at the inner side of the peripheral wall 18A of the lower case 18 constituting a left wall 12C (i.e., the left-side wall, along the direction of arrow A, of the peripheral walls 16A and 18A) of the case 12, a protrusion 74, which is connected to the free movement-regulating wall 28, is disposed at a position in the front-rear direction corresponding to the protrusion 48 and spans the overall height. The recess 76, which opens leftward (i.e., toward the outer surface of the right wall 12B) and upward (i.e., toward the open end side), is disposed at an outer side of the protrusion 74. A lower bottom of the recess 76 is defined by the peripheral wall 18A and the ribs 66, and, similar to the recess 64, the weight-reducing sections 67 are disposed in a lower direction thereof.

A protrusion 78, which connects to the free movement-regulating wall 28, is disposed at an inner side of the peripheral wall 16A constituting the left wall 12C of the upper case 16 and spans the overall height thereof. A front end of the protrusion 78 corresponds to the front end of the protrusion 74, but the length of the protrusion 78 in the front-rear direction is longer than the length of the protrusion 74 corresponding thereto. The cell retention notch 58 that opens upward and leftward is disposed at an outer side of the protrusion 78. In the present embodiment, the opening width of the cell retention notch 58 is wider than the opening width of the recess 76, and the left-right direction depth of the cell retention notch 58 is substantially the same as the depth corresponding to the recess 76 (engagement hole 62).

Also, in the case 16, a blocking piece 80, which serves as a blocking portion extending downward along the peripheral wall 16A, is disposed at a position corresponding to the recess 76. The width of the blocking piece 80 corresponds to the opening width of the recess 76, and the height at which the blocking piece 80 protrudes from the peripheral wall 16A (protrusion 78) is smaller than the opening height of the recess 76. When the blocking piece 80 is inserted into the recess 76, the upper portion of (i.e., part of ) the recess 76 is blocked off.

Plural (two in the present embodiment) ribs 82 that span the overall height (which height is measured from the bottom surface 76A to the blocking piece 80) are disposed at the inner surface of the blocking piece 80, and protrude leftward (toward the inside of the case 12). Each rib 82 abuts against a side bottom surface 76A of the recess 76 in a state in which the blocking piece 80 has been inserted into the recess 76. Thus, the strength of the blocking piece 80, whose lower end does not abut against the lower case 18, is secured.

As described above, when the upper case 16 and the lower case 18 are joined together and fixed by the screws, the peripheral wall 16A and the peripheral wall 18A abut against each other, and the upper and lower protrusion 74 and the protrusion 78 abut against each other. Also, as shown in FIG. 6B, the bottomed engagement hole 62, which opens only toward the outer surface (leftward, sideward) of the left wall 12C, is formed lower than the portion (parting line PL) at which the peripheral wall 16A and the peripheral wall 18A abut, due to the fact that the upper portion of the recess 76 is blocked off by the blocking piece 80 being inserted into the recess 76. That is, the lower end of the blocking piece 80 inserted into the recess 76 defines the upper edge of the engagement hole 62.

The front-rear direction position with respect to the front wall 12A, the vertical direction position with respect to the bottom panel 18B, the opening width, and the opening height of the engagement holes 60 and 62 are mutually identical. The height of the lower edge of the engagement holes 60 and 62 is determined so that the retention members 118 described later cannot enter therein, and the height of the upper edges of the engagement holes 60 and 62 is determined so that the drive rollers 122 and 124 described later cannot enter therein.

As described above, in the present embodiment, the lower case 18 corresponds to the "base" in the present invention, and the upper case 16 corresponds to the "cover" in the present invention. It should be noted that the thickness of each of the ribs 72 and 82 is set to be equal to or less than the plate thickness of the peripheral wall 16A. The number of ribs 72 and 82 is appropriately determined according to the width (length corresponding to the opening width of the recess 64) of the blocking piece 70.

Further, engagement recesses 84 and 86 are respectively disposed behind each of the engagement holes 60 and 62 in the lower case 18. The engagement recesses 84 and 86 open downward and sideward (rightward or leftward) at a position lower than the parting line PL in the vicinity of the rear end of the case 12, and the retention members 118 described later are able to engage with and disengage from the engagement recesses 84 and 86.

(Structure of Library Device)

Next, the schematic structure of an example of the library device 90, in which is used the recording tape cartridge 10, will be described on the basis of FIG. 8.

Figure 8:
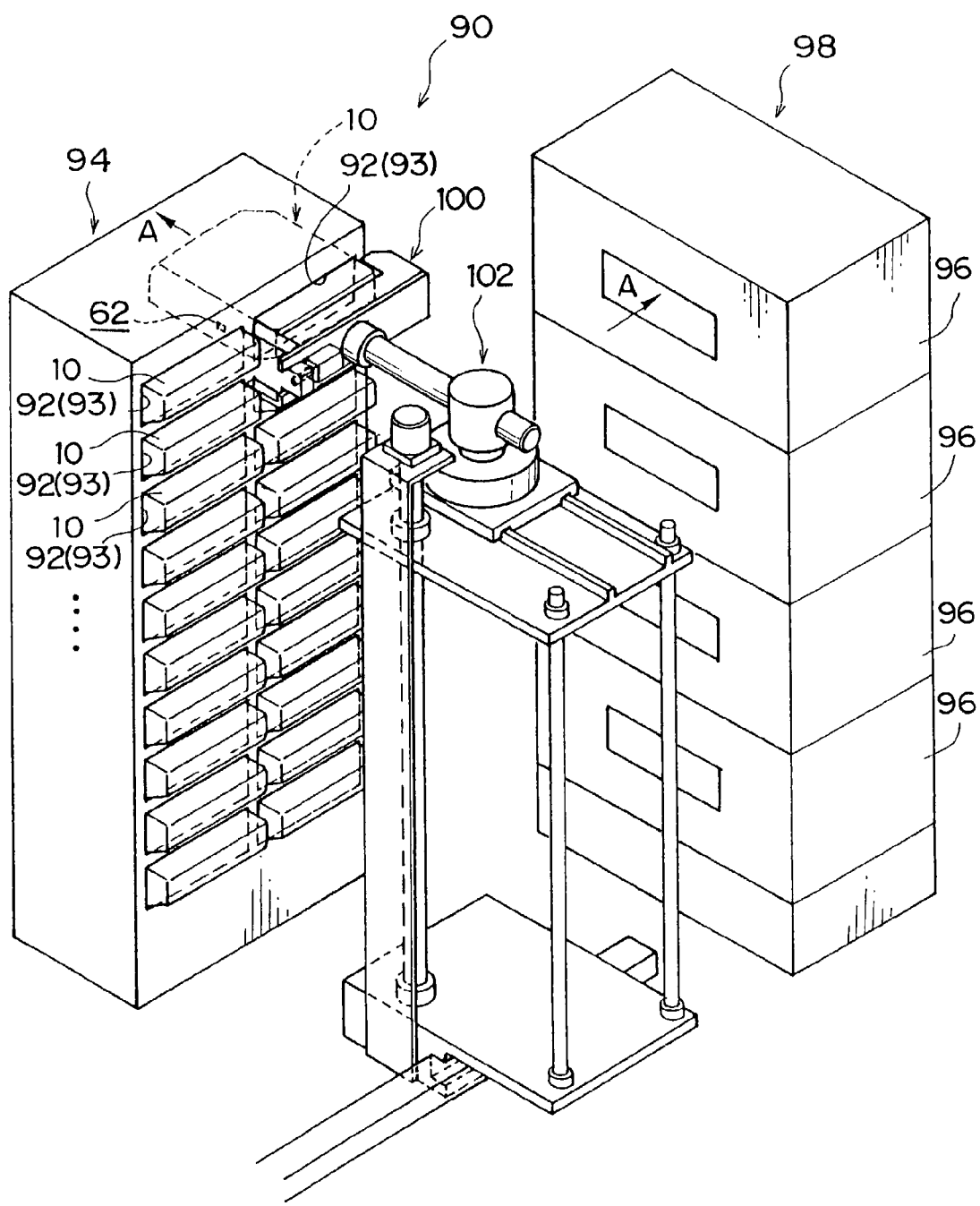
FIG. 8 is a perspective view showing the overall schematic structure of a library device in which is used the recording tape cartridge to which the structure of the case according to the embodiment of the invention has been applied.

As shown in the schematic perspective view of FIG. 8, the library device 90 is disposed with a housing shelf unit 94 that includes plural holders (magazines) 92 or holders 93 in which can be housed the recording tape cartridges 10, a recording and playback unit 98 disposed with one or more drive devices 96 (four in the present embodiment), and a moving mechanism 102 that can move a chucking mechanism 100 capable of holding the rear end sides of the recording tape cartridges 10 between each holder 92 and each drive device 96. The internal structure of the holders 92 and 93 will be described later.

In the library device 90, the recording tape cartridge 10 to be used is extracted from the holder 92 by the chucking mechanism 100 and the moving mechanism 102, and loaded into the drive device 96 of the recording and playback unit 98. After being used, the recording tape cartridge 10 is extracted from the drive device 96 by the chucking mechanism 100 and the moving mechanism 102, and then housed (loaded) in the holder 92 of the housing shelf unit 94.

Thus, the housed recording tape cartridges 10 can be automatically and rapidly housed and extracted, and a large-scale (large-capacity) information backup system is constructed. The library device 90 handles many kinds of recording tape cartridges, including the recording tape cartridges 10, and is disposed with drive devices 96 and holders 92 having different specifications corresponding to the types of recording tape cartridges.

Next, the holder 92 that houses the recording tape cartridge 10 will be described on the basis of FIG. 9. As shown in the figure, a pair of upper and lower positioning stoppers 104 and 106, which serve as references for positioning the recording tape cartridge 10 in the front-rear direction, is disposed at the deepest part inside the holder 92. The right-side (opening 20 side) positioning stopper 104 is disposed with an incline 104A corresponding to the opening 20 of the case 12, and also serves as a reference for positioning the recording tape cartridge 10 in the left-right direction.

A pair of left and right pivot arms 108 is disposed near the open end of the holder 92. An engagement pawl 110 is disposed at an end of each pivot arm 108. Each engagement pawl 110 is formed so as to be able to respectively engage with and disengage from the engagement holes 60 and 62 of the case 12. Each pivot arm 108 is pivoted by drive means that acts in association with detection means for detecting entry of the recording tape cartridge 10, and causes the engagement pawls 110 to advance into and retreat from (engage with and disengage from) the engagement holes 60 and 62.

In the library device 90 disposed with the holders 92, the rear part of the housed recording tape cartridge 10 (case 12) protrudes from the open end of the holder 92. The chucking mechanism 100 may be configured to hold the rear part of the case 12 from left and right, or configured to hold the case 12 by engaging a chuck pawl of the chucking mechanism 100 with the engagement recesses 84 and 86 exposed to the outside.

Identification means for identifying the angle of inclination of the free surface of the opening 20 of the case 12 is disposed near or at the positioning stopper 104 (incline 104A) within the holder 92. When a recording tape cartridge which does not correspond to the holder 92 is housed in the holder 92, a signal for causing the chucking mechanism 100 and the moving mechanism 102 to eject the recording tape cartridge is outputted.

Next, the holder 93 for holding the recording tape cartridge 10 will be described on the basis of FIG. 10. As shown in the figure, the holder 93 includes a deep-inner wall 112, which serves as a reference for positioning the recording tape cartridge 10 in the front-rear direction, and an inclined stopper 114, which is disposed near the deep-inner wall 112 at an incline with respect to the free surface of the case 12 and serves as a reference for positioning the recording tape cartridge 10 in the left-right direction.

A pair of left and right plate springs 116 is disposed near an opening in the holder 93, and a front of the opening flares out in a tapered manner. A retention member 118 is disposed at an end of each plate spring 116. The retention members 118 are formed so as to be able to respectively advance into and retreat from the engagement recesses 84 and 86.

Each retention member 118 is disposed at left and right ends of an insertion path of the recording tape cartridge 10. When the recording tape cartridge 10 is inserted into the holder 93 and the retention members 118 abut against the case 12, insertion of the recording tape cartridge 10 is allowed by the deformation of the plate springs 116. When the front wall 12A of the case 12 abuts against the deep-inner wall 112, the retention members 118 enter the engagement recesses 84 and 86 due to the resilience of the plate springs 116. When the recording tape cartridge 10 is to be ejected and an ejection force of a predetermined value or greater acts thereon, part of the ejection force is converted, by curved outer surface of the retention members 118, to a force causing the retention members 118 to withdraw from the engagement recesses 84 and 86, the retention members 118 withdraw from the engagement recesses 84 and 86 due to the deformation of the plate spring 116, and thereby ejection is allowed.

Large areas above and below the center of the open end side of the holder 93 are cut out. In the library device 90 disposed with the holder 93, the chucking mechanism holds the rear part of the recording tape cartridge 10 (case 12) from above and below.

It should be noted that the identification means for identifying the angle of inclination (presence or absence of contact, distance, etc.) of the free surface of the opening 20 of the case 12 is also disposed near or at the inclined stopper 114 within the holder 93.

Figure 11:
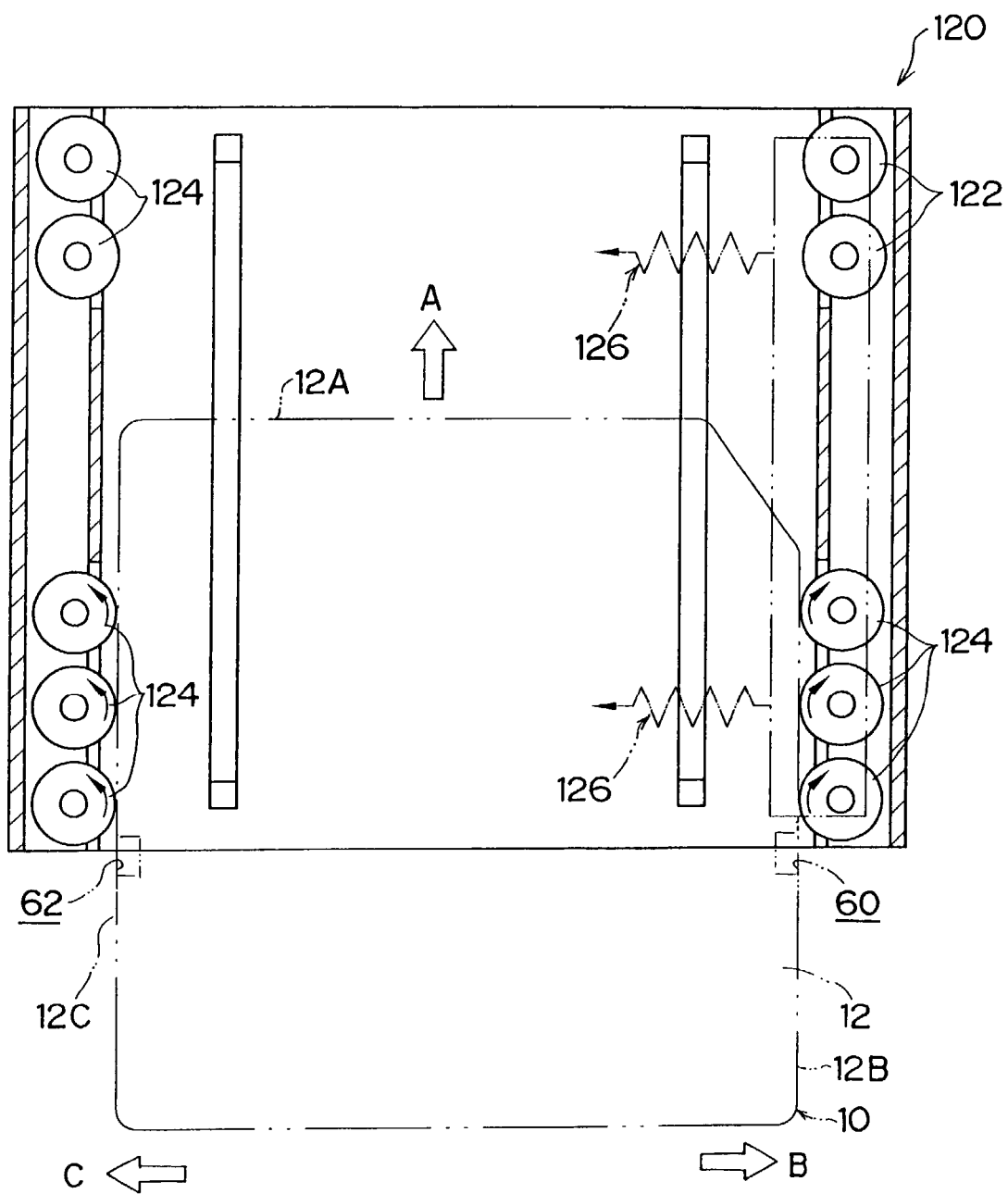
FIG. 11 is a plan view showing a conveying mechanism of the library device for conveying the recording tape cartridge to which the structure of the case according to the embodiment of the invention has been applied.

The library devices 90 may be provided with a conveying mechanism 120, as shown in FIG. 11, in place of either both or one of the chucking mechanism 100 and the moving mechanism 102. The conveying mechanism 120 is disposed, for example, at the housing shelf unit 94 and moves the recording tape cartridge 10 towards the holder 92 or holder 93 into which the recording tape cartridge 10 is inserted (housed) and from which the recording tape cartridge 10 is ejected.

Plural drive rollers 122 and 124 that are rotatingly driven by a drive mechanism (not illustrated) are disposed at left and right sides inside the conveying mechanism 120. The right-hand side group of the drive rollers 122 is urged toward the inner side by springs 126. When a portion of the recording tape cartridge 10 (case 12) is inserted into the holder 92 or 93, the conveying mechanism 120 transmits a rotational force to the drive rollers 122 and 124 while the drive rollers 122 and 124 are being pushed against the right wall 12B and the left wall 12C of the case 12 by the urging force of the springs 126, and sends (conveys) the recording tape cartridge 10 a desired direction (the direction of arrow A or the direction opposite to arrow A) corresponding to the direction in which the drive rollers 122 and 124 are rotated.

Figure 12A:
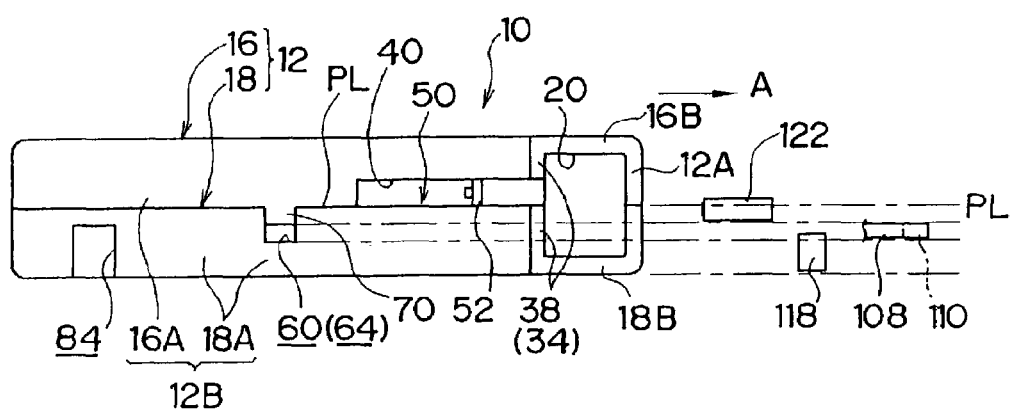
FIGS. 12A and 12B are schematic side views showing the relation in a height direction between drive rollers, retention members, and engagement pawls of the library device and the recording tape cartridge to which the structure of the case according to the embodiment of the invention has been applied.
Figure 12B:
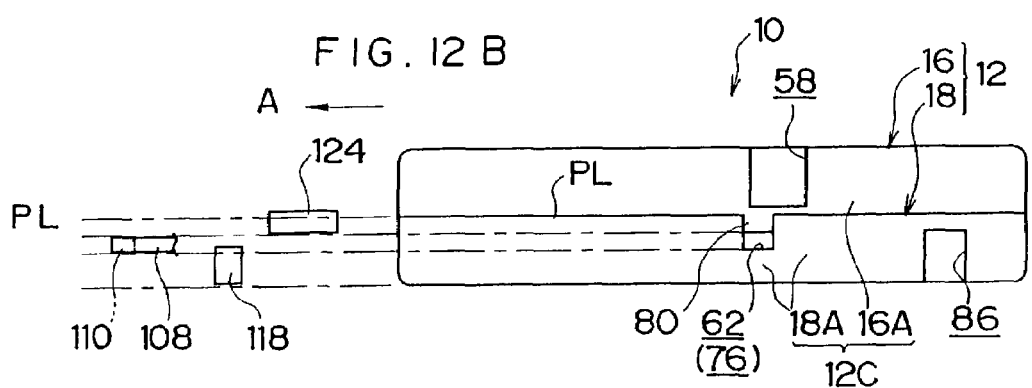

The positions in the height direction of the drive rollers 122 and 124 of the conveying mechanism 120, the retention members 118 of the holder 93, and the engagement pawls 110 of the holder 92 are as shown in FIG. 12 when seen in relation to the engagement holes 60 and 62 of the case 12.

Specifically, as described above, the engagement pawls 110 are capable of engaging with and disengaging from the engagement holes 60 and 62. It should be noted that the engagement pawls 110 do not enter the engagement recesses 84 and 86 because the holder 92 is structured such that the rear portion of the housed case 12 is made to protrude from the open end.

The retention members 118 correspond to the engagement recesses 84 and 86, which open in the lower direction of the case 12, and are disposed so that the lower ends thereof substantially correspond to the lower end of the case 12. Due to the fact that the lower ends of the engagement holes 60 and 62 are defined by the peripheral wall 18A, the retention members 118 abut against (slide across) the peripheral wall 18A and do not enter the engagement holes 60 and 62, even if the resilience of the plate springs 116 acts thereon.

The drive rollers 122 and 124 are disposed so that upper and lower ends thereof sandwich the parting line PL of the case 12, and cannot enter the engagement holes 60 and 62, which are formed as a result that the upper portions of the recesses 64 and 76 are blocked off by the blocking pieces 70 and 80 and which are positioned below the parting line PL. The drive rollers 122 cannot enter the slit 40 positioned above the parting line PL, either, whereby mistaken operation of the operational projection 52 is prevented.

Next, the action of the present embodiment will be described. First, the action in the library device 90 disposed with the holders 92 will be described.

Figure 9:
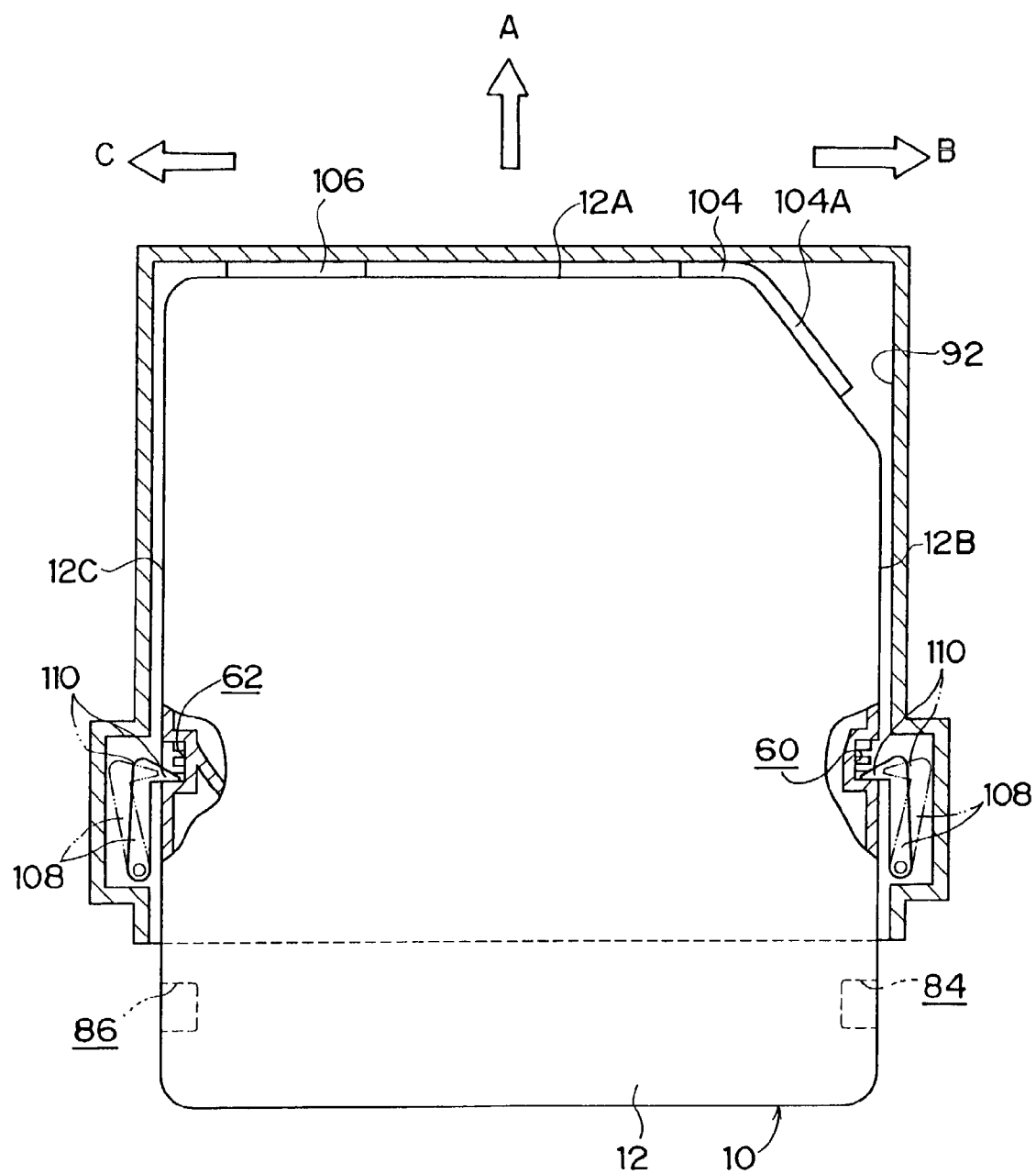
FIG. 9 is a partially cut-off plan view showing a state where the recording tape cartridge to which the structure of the case according to the embodiment of the invention has been applied is housed in a holder of the library device.

As shown in FIG. 9, the recording tape cartridge 10 having the above-mentioned structure is housed and retained in the holder 92 in a state in which the engagement pawls 110 have been respectively inserted into the engagement holes 60 and 62. When the recording tape cartridge 10 is to be used, the engagement pawls 110 are moved to positions at which they are not engaged with the engagement holes 60 and 62 due to the pivoting of the pivot arms 108. The recording tape cartridge 10 is ejected from the holder 92 by the moving mechanism 102 while being held by the chucking mechanism 100, and then loaded into the drive device 96.

In association with this loading operation (movement relative to the drive device 96), the operational projection 52 of the door 50 is moved substantially backward with respect to the case 12 as the operational projection 52 engages with the open/close member 57 fixed within the drive device 96. Thereupon, the door 50 is rotated around the outer side of the pin holder 24 (lead pin 22) and the reel 14 without sticking out from the movement locus along its curved shape, whereby the opening 20 is opened.

The lead pin 22 is pulled out from the opened opening 20, and guided to and retained at the take-up reel of the drive device 96. When the take-up reel and the reel 14 are driven to rotate synchronously in this state, the magnetic tape T is successively pulled out from the case 12 while being taken up at the take-up reel, and recording or playback of information is effected by a recording/playback head disposed along a predetermined tape path.

When all of the magnetic tape T has been rewound onto the reel 14 and the lead pin 22 is retained at the pin holder 24, the recording tape cartridge 10 is ejected from the drive device 96, and the door 50 closes off the opening 20 due to the urging force of the coil spring 56.

The recording tape cartridge 10 ejected by a predetermined amount from the drive device 96 is pulled out from the drive device 96 by the moving mechanism 102 as it is held by the chucking mechanism 100, and inserted into the holder 92.

When the recording tape cartridge 10 (case 12) abuts against the positioning stoppers 104 and 106 and is positioned, the pivot arms 108 are activated and the engagement pawls 110 enter the engagement holes 60 and 62. Thus, the recording tape cartridge 10 returns to the state of FIG. 9, where the recording tape cartridge 10 is retained in a positioned state within the holder 92, whereby the next chucking by the chucking mechanism 100 is precisely effected.

Next, the part of the action in the library device 90 disposed with the holder 93 that differs from the above-described action will be described.

Figure 10:
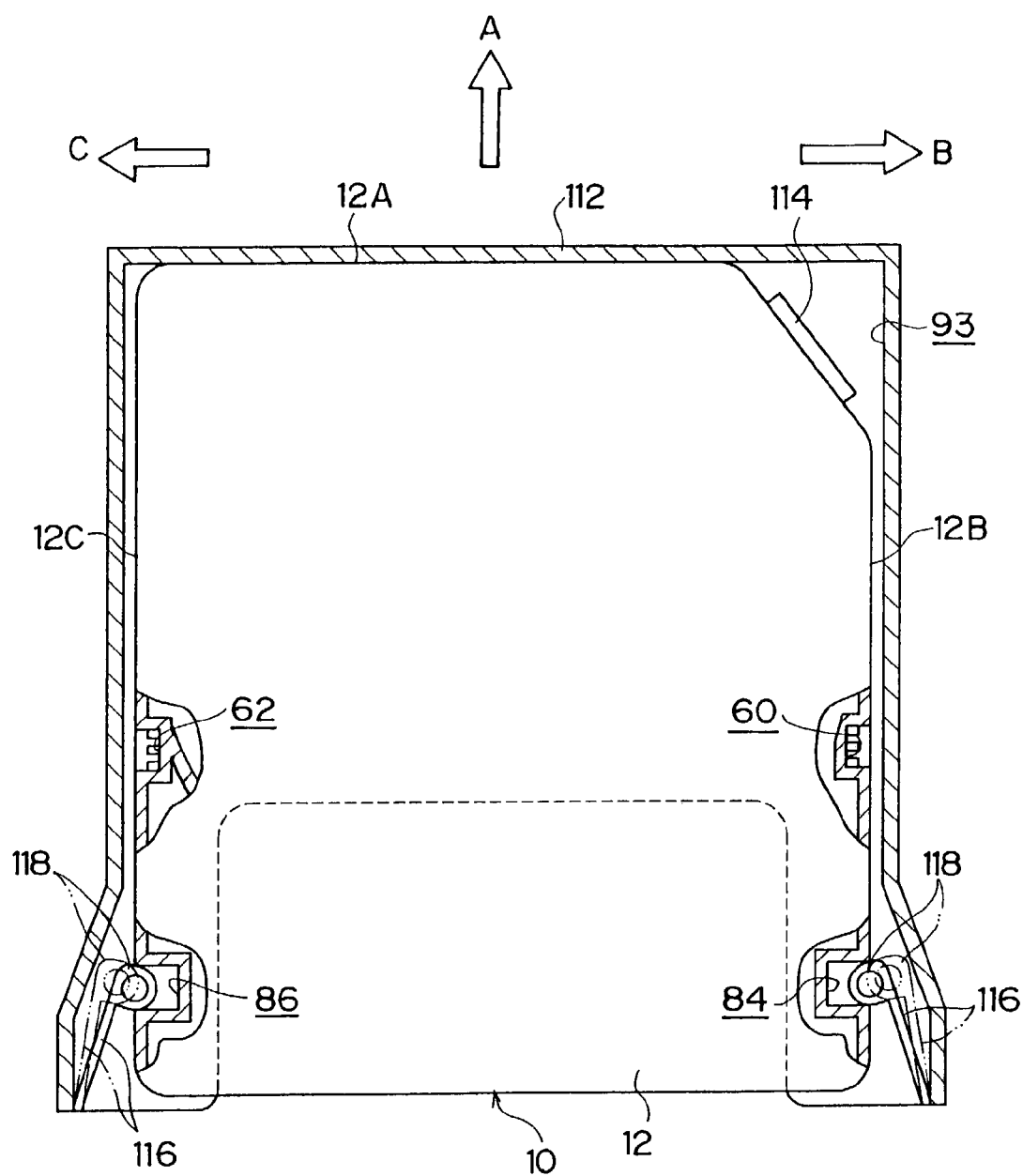
FIG. 10 is a partially cut-off plan view showing a state where the recording tape cartridge to which the structure of the case according to the embodiment of the invention has been applied is housed in another holder of the library device.

As shown in FIG. 10, the recording tape cartridge 10 is housed and retained in the holder 93 in a state in which the retention members 118 have been respectively inserted into the engagement recesses 84 and 86. When the recording tape cartridge 10 is to be used, the chucking mechanism holds the rear part of the case 12 from above and below, and the moving mechanism 102 moves rearward (the direction opposite to the direction of arrow A), i.e., causes the chucking mechanism 100 to move rearward.

Thereupon, an ejection force equal to or greater than a predetermined value acts on the case 12, and the retention members 118 withdraw from the engagement recesses 84 and 86 due to the deformation of the plate springs 116. Thus, the recording tape cartridge 10 is released from the retention members 118, ejected from the holder 93 by the chucking mechanism 100 moving further rearwards, and thereafter loaded into the drive device 96.

After being used, the recording tape cartridge 10 is pulled out from the drive device 96 by the moving mechanism 102 while being held from above and below by the chucking mechanism 100. The recording tape cartridge 10 is then inserted into the holder 93 while sliding with the retention members 118 that have withdrawn from the conveyance path of the case 12 by the deformation of the plate springs 116 due to abutment with the case 12.

In this state, even if the engagement holes 60 and 62 reach positions corresponding to the retention members 118, the retention members 118 are obstructed from entering the engagement holes 60 and 62 due to the peripheral wall 18A below the engagement holes 60 and 62. For this reason, the recording tape cartridge 10 is correctly inserted into the holder 93.

When the recording tape cartridge 10 (case 12) abuts against the deep-inner wall 112 and the inclined stopper 114 and is positioned, the engagement recesses 84 and 86 reach respective positions corresponding to the retention members 118, and the retention members 118 respectively enter the engagement recesses 84 and 86 due to the resilience of the plate springs 116. Thus, the recording tape cartridge 10 returns to the state of FIG. 10, where it is retained in an appropriately positioned state within the holder 93, whereby the next chucking by the chucking mechanism 100 is precisely effected.

As an example of an instance where the recording tape cartridge 10 is inserted into the holder 92 by the conveying mechanism 120, the part of the action in the library device 90 disposed with the conveying mechanism 120 that is different from the above-described action will be described.

The conveying mechanism 120 matches an end side opening to the open end of the holder 92 housing the recording tape cartridge 10. When a portion of the recording tape cartridge 10 is inserted into the holder 92 from another end side opening of the conveying mechanism 120 in this state, the drive rollers 122 and 124 are rotatingly driven. The left and right drive rollers 122 and 124 transmit a rotational force while the case 12 is pressed from left and right at the parting line PL portion by the urging force of the springs 126, and convey the recording tape cartridge 10 in the direction of arrow A.

Even if the engagement holes 60 and 62 respectively pass the positions at which the drive rollers 122 and 124 are disposed, the drive rollers 122 and 124 are obstructed from entering the engagement holes 60 and 62 due to the blocking pieces 70 and 80 above the engagement holes 60 and 62. For this reason, the recording tape cartridge 10 is correctly sent (conveyed) by the conveying mechanism 120. In association with this sending, the recording tape cartridge 10 is inserted into the holder 92 in the same manner as described above, and housed and retained in the holder 92.

In a library device 90 of a structure in which guide rollers that have the same structure (the same position in the vertical direction, the same shape) as the drive rollers 122 and 124 of the conveying mechanism 120 are disposed in the holder 92 or 93, the recording tape cartridge is correctly guided by the guide rollers without the guide rollers enter the engagement holes 60 and 62 of the case 12.

Because the recesses 64 and 76 disposed in the lower case 18 open upward, the lower case 18 can be formed without undercuts on the lower case 18 and without the use of slide cores. Also, because the blocking pieces 70 and 80, which are disposed at the upper case 16 and block off portions of the recesses 64 and 76, simply extend along the peripheral wall 16A, it is also possible to form the upper case 16 without undercuts and without the use of slide cores.

In the recording tape cartridge 10 to which the structure of the case according to the embodiment of the invention has been applied, the engagement holes 60 and 62, which open only toward the outer surface (sideward, i.e., rightward or leftward) of the peripheral wall 18A of the case 12 and are disposed below the parting line PL that is the site at which the upper case 16 and the lower case 18 abut, can be formed without forming undercuts on either the upper case 16 or the lower case 18.

Also, because the blocking pieces 70 and 80 disposed at the upper case 16 block portions of the recesses 64 and 76, the engagement holes 60 and 62 of the case 12 that open only sideward can be disposed at desired positions and with desired dimensional shapes, freedom of design (the freedom with which the recording tape cartridge 10, the library device 90, and the drive device 96 are designed) is improved. Further, it is possible for the opening height and opening width (position with respect to predetermined reference portions) of the engagement holes 60 and 62 to be altered by altering the shape of the blocking pieces 70 and 80 (e.g., altering the height of the blocking piece 70, disposing another blocking piece on the blocking piece 70 so as to extend from the blocking piece 70, etc.). That is, simply by altering the mold of the upper case 16, it is possible to alter the shape, dimension, and position of the engagement hole 60 and the like.

Moreover, because the ribs 72 and 82 are respectively disposed at the blocking pieces 70 and 80, the strength of the blocking pieces 70 and 80 (i.e., the case 12) is secured. In particular, because the ribs 72 and 82 respectively abut against the side bottom surfaces 64A and 76A of the recesses 64 and 76, the strength of portions around the engagement holes 60 and 62 of the case 12 becomes even better.

In the present embodiment, the engagement holes 60 and 62 are deeper in the left-right direction of the case 12 than the plate thickness of the peripheral wall 18A. By disposing the ribs 72 and 82, however, it is possible to prevent sink marks from forming in the outer surface of the case 12, which is the design surface, and eliminate a thick portion at the upper case 16. In particular, because the cell retention notch 8 is disposed above the engagement hole 62 at the left wall 12C of the case 12, it is possible to prevent sink marks from forming without disposing the weight-reducing hole 68 in the upper case 16.

In the present embodiment, the lower edge of the engagement hole 60 is higher than the upper surface of the bottom panel 18B. However, by disposing the weight-reducing sections 67 (the rib 66), it is possible to prevent sink marks from forming in the outer surface of the case 12, which is the design surface, and eliminate a thick portion at the lower portion of the engagement hole 60. That is, by disposing the rib 66, it is possible to obtain engagement holes 60 and 62 of a desired depth (depth measured from the outer surface of the case 12 to side bottom surfaces 64A and 76A) at desired positions in the vertical direction without sink marks arising in the outer surface of the case and without complicating the mold structure (e.g., without disposing individual undercuts below the recess 64 in the inner side of the lower case 18 in order to prevent sink marks). Also, by leaving the rib 66 and disposing the weight-reducing sections 67, the strength of the case 12 can also be secured.

Also, because the case 12 is formed so that the blocking pieces 70 and 80 having widths corresponding to the opening widths of the recesses 64 and 76 are inserted into (fitted together with) the recesses 64 and 76, deformation of the case 12, such as twisting, is suppressed by the recesses 64 and 76 and the blocking pieces 70 and 80 mutually interfering, even if the case 12 sustains shock due to the case 12 being dropped or the like, and thus generation of gaps in the parting line PL (between the peripheral walls 16A and 18A) is suppressed. In particular, in the present embodiment, because the ribs 72 and 82 that abut against the side bottom surfaces 64A and 76A are disposed at the blocking pieces 70 and 80, in the event that the case 12 is dropped, generation of gaps in the parting line PL (between the peripheral walls 16A and 18A) resulting from the case 12 being dropped is further suppressed by the blocking pieces 70 and 80 and the side bottom surfaces 64A and 76A mutually interfering at the time of dropping.

Figure 14:
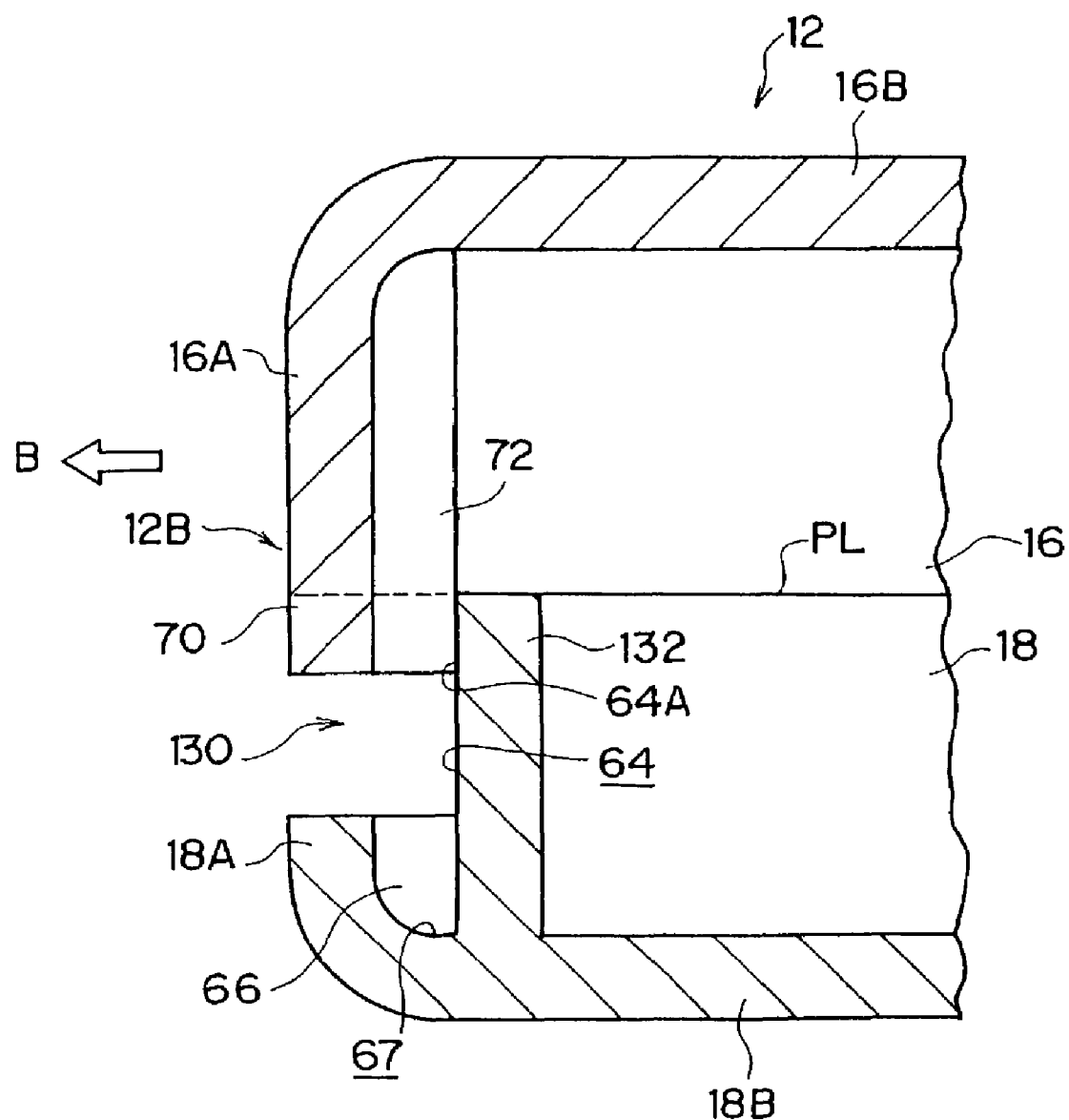
FIG. 14 is a cross sectional view showing the engagement hole according to the modified example of the recording tape cartridge to which the structure of the case according to the embodiment of the invention has been applied.

In the above-described embodiment, the upper and lower protrusions 48 abut against each other, or the protrusion 74 abuts against the protrusion 78, so that the engagement holes 60 and 62 are formed. However, the invention is not limited to the same. As shown in FIGS. 13 and 14, the invention may be configured to have a structure according to a first modified example.

In FIG. 13, the structure of an engagement hole 130 of the first modified example, the engagement hole 130 being formed lower than the parting line PL in the right wall 12B of the case 12, is shown in an exploded perspective view corresponding to FIG. 14. In FIG. 14, the structure of the engagement hole 130 is shown in a cross sectional view corresponding to FIG. 6A.

As shown in these drawings, the engagement hole 130 shares features in common with those of the preceding embodiment, in that a portion of the recess 64, which is disposed in an outer side of a protrusion 132 projecting toward the inside of the lower case 18 and is disposed with the side bottom surface 64A, the ribs 66, and the weight-reducing sections 67, is blocked off by the blocking piece 70 that extends along the peripheral wall 16A of the upper case 16, and includes the ribs 72. However, the engagement hole 130 is different from the preceding embodiment in that there is no portion on the upper case 16 that abuts against the protrusion 132.

That is, when the upper case 16 and the lower case 18 are joined by screws, the peripheral wall 16A and the peripheral wall 18A abut against each other, and a portion of the engagement hole 130 is blocked off by the blocking piece 70 being inserted into the recess 64.

According to the structure according to the first modified example, effects that are completely identical to those of the preceding embodiment can be obtained, and the structure (mold) of the upper case 16 becomes simple. However, because there is no portion on the upper case 16 that abuts against the convexity 132, a path is created by which dust and the like can infiltrate the case 12. For this reason, it is preferable to dispose the engagement hole 130 on a portion of the case 12 that is partitioned off by the free movement-regulating 28 from the space in which the reel 14 is disposed.

Also, in the preceding embodiment, the weight-reducing sections 67 disposed in the bottom of the recesses 64 and 76 open upward. However, the present invention is not limited to the same. As shown in FIGS. 15A, 15B, 16A, and 16B, the invention may also be configured to have a structure according to a second modified example.

Figure 15A:
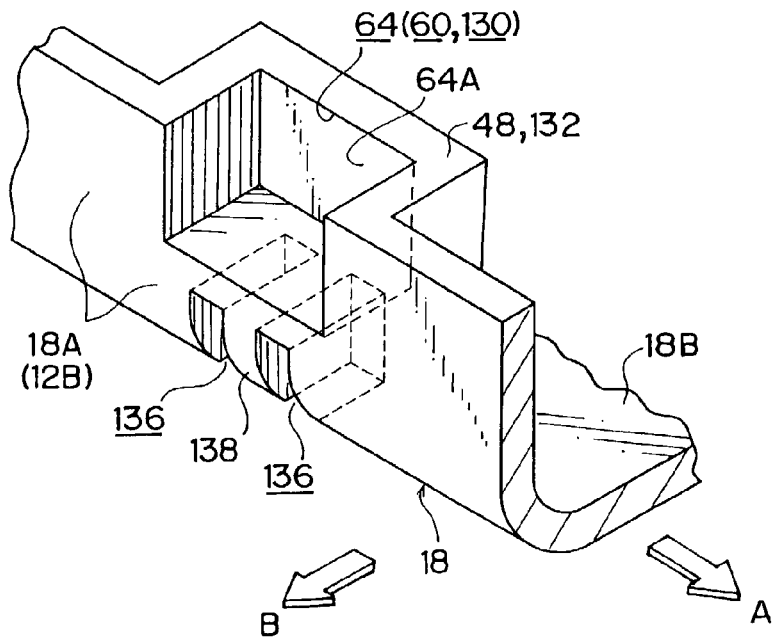
FIGS. 15A and 15B are views showing a modified example of a weight-reducing structure of a lower case forming the recording tape cartridge to which the structure of the case according to the embodiment of the invention has been applied, with FIG. 15A being a perspective view showing a right-side portion of the case and FIG. 15B being a perspective view showing a left-side portion of the case.

As shown in FIG. 15A, the bottom of the recess 64 is a flat surface, and plural (two in the present second modified example) weight-reducing slits 136 that open downward and sideward (rightward in the present second modified example) are disposed at a lower portion of the recess 64 of the lower case 18. Portions sandwiched between the slits 136 are ribs 138, and the thickness of the ribs 138 is equal to or less than the plate thickness of the peripheral wall 18A.

Figure 15B:
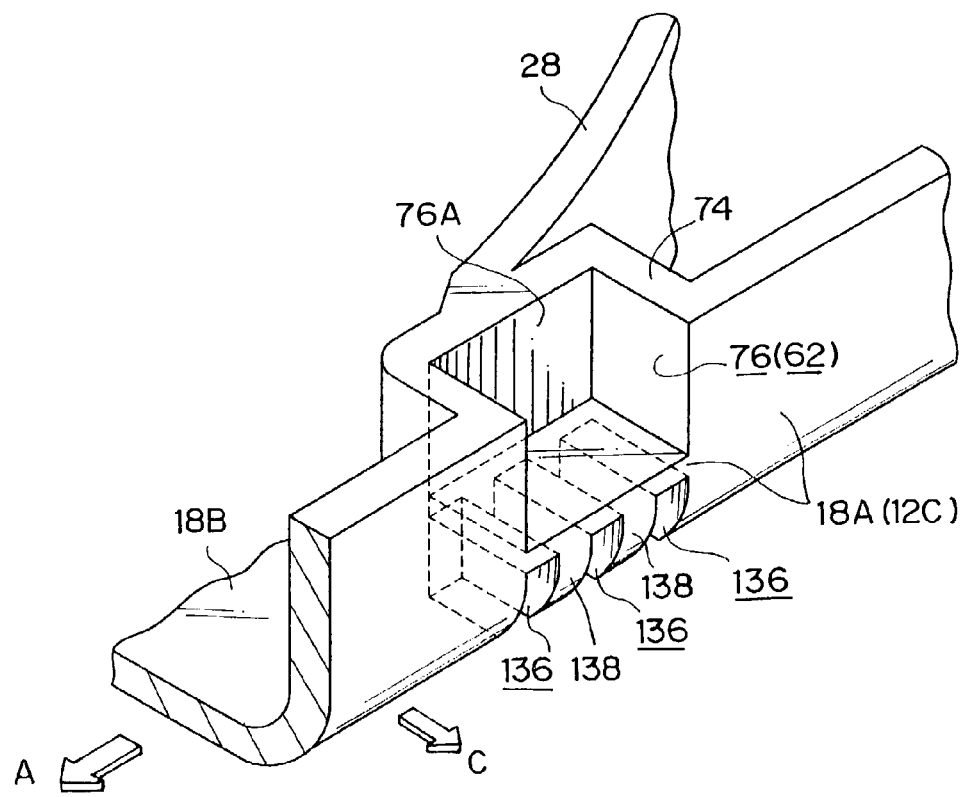

As shown in FIG. 15B, the bottom of the recess 76 is a flat surface, and plural (three in the present second modified example) weight-reducing slits 136 that open downward and leftward are disposed at a lower portion of the recess 76 of the lower case 18. Portions sandwiched between the slits 136 are ribs 138, and the thickness of the ribs 138 is equal to or less than the plate thickness of the peripheral wall 18A.

According to the structure of the second modified example, effects that are completely identical to those of the preceding embodiment can be obtained. In particular, as shown in FIGS. 16A and 16B, thickening of the lower portions of the recesses 64 and 76 of the lower case 18 can be prevented without disposing undercuts, and it is possible to obtain engagement holes 60 and 62 (130) having a desired depth in the left-right direction at desired positions in the vertical direction. Also, due to the ribs 138, the strength of the case 12 is secured, and mistaken insertion of a member of the library device 90 or the drive device 96 into the weight-reducing sections that open at the outer side of the case 12 is obstructed.

It should be noted that, in the present second modified example, a single lower slit 136 can be disposed at the recesses 64 and 76 (without disposing the ribs 138; e.g., using the bottom surface of the slit 136 as a reference surface for positioning the case 12 in the height direction within the drive device 96). However, in the structure according to the present second modified example, due to the ribs 138, the strength of the case 12 is secured, and mistaken insertion of a member of the library device 90 or the drive device 96 into the weight-reducing sections that open at the outer side of the case 12 is obstructed.

In the preceding embodiment and in each of the modified examples, the invention is disposed with the engagement holes 60, 62, and 130, into which the engagement pawls 110 of the library device 90 are inserted. However, the invention is not limited to the same. It goes without saying that the bottomed holes (recesses) formed by the recesses 64 and 76 and the blocking pieces 70 and 80 can be used for all sorts of purposes. Accordingly, there are no limitations on the dimensional shape of the bottomed holes and the positions at which the bottomed holes formed by recesses 64 and 76 and the blocking pieces 70 and 80 are disposed. For example, the recess 64 may be disposed in the upper case 16 and the blocking piece 70 may be disposed at the lower case 18 (and the upper case 16 may be used as the base and the lower case 18 may be used as the cover). Alternatively, the bottomed hole formed by the recess 76 and the blocking piece 80 may be disposed in the front wall 12A of the case 12.

Also, in the preceding embodiment and in each of the modified examples, a structure in which the engagement hole 60 is formed by the recess 64 of the lower case 18 and the blocking piece of the upper case 16 was described as a preferable example applied to the recording tape cartridge 10 of the above-described structure. However, the present invention is not limited to the same. It goes without saying that the structure of the engagement hole 60 can be applied to a recording tape cartridge of whatever format. Accordingly, the recording tape cartridge 10 may be one in which the opening 20 is disposed at the front wall 12A or the right wall 12B of the case 12. This opening 20 may be opened and closed off by a flat plate-like door 50 by pivoting the door 50 around a support axis or linearly sliding the door 50. Alternatively, the opening 20 may be opened and closed off by a leader block connected to an end of the magnetic tape T and operated by the pull-out means of the drive device. It also goes without saying that the recording tape is not limited to the magnetic tape T.

Moreover, the structure of the case in the present invention, in which the engagement hole 60 is formed by the recess 64 or the like of the lower case 18 and the blocking piece 70 of the upper case 16 is not limited to a structure applied to the single-reel recording tape cartridge 10 disposed with the single reel 14, and may be applied to cases for any purpose. Accordingly, the structure of the case can be applied to two-reel recording tape cartridges housing two reels 14 for winding off and taking up recording tape, disc cartridges rotatably housing disc media (e.g., magnetic discs, optical discs, and magnetic optical discs), and various types of cases that form cases for electrical devices. The invention is not limited to a structure in which the peripheral wall 16A and the peripheral wall 18A are of the same height, either, and may comprise a structure in which a peripheral wall is not disposed at one (the member corresponding to the cover) of the upper case 16 and the lower case 16.

Moreover, in the preceding embodiment and in each of the modified examples, a preferable structure was described in which the ribs 72 and 82 were respectively disposed to project from the inner surfaces of the blocking pieces 70 and 80. However, the present invention is not limited to the same. It goes without saying that the structure can be one in which the blocking pieces 70 and 80 are not disposed with the ribs 72 and 82. In particular, in a structure in which the depth of the engagement hole 60 as measured from the outer surface of the case 12 to the side bottom surface 64A is equal to or less than the place thickness of the peripheral wall 18A, as long as the blocking piece 70 directly abuts against the side bottom surface 64A, the strength of the case 12 can be secured without giving rise to sink marks in the design surface of the case 12, and the generation of gaps in the parting line PL resulting from shock when the case 12 is dropped or the like can be appropriately suppressed.

As described above, the case according to the invention has a remarkable effect in that a recess that is disposed apart from a site at which a cover is joined to a peripheral wall of a base and opens only toward an outer surface of the peripheral wall can be formed without disposing undercuts on the base.

What is claimed is:

1. A hollow case formed by a cover being joined to an open end of a peripheral wall of a base formed in a bottomed container shape, the case including:
   a bottomed recess that is disposed in the peripheral wall of the base and opens to a case outer side surface of the peripheral wall and the open end; and
   a blocking portion that is projectingly disposed in the cover at the juncture between the cover and the base and inserted into the recess to thereby block off a portion of the recess,
   wherein when the cover is joined to the base, a bottomed engagement hole, which opens only toward the case outer side surface of the peripheral wall of the base, is formed due to the blocking portion blocking off the portion of the recess.

2. The case of claim 1, wherein ribs that extend from an inner surface of the blocking portion and abut against a bottom surface of the recess, which bottom surface is oriented in a case vertical direction, are disposed at the inner surface of the blocking portion.

3. The case of claim 1, wherein the blocking portion is structured to fit into the recess.

4. The case of claim 1, wherein the recess is disposed in a shape protruding from the peripheral wall of the base toward an inner side direction of a case width, and the blocking portion includes a blocking piece that extends out from the cover, such that the blocking piece is substantially flush with the outer surface of the peripheral wall of the base, and blocks off a portion of the recess.

5. A hollow case formed by a cover being joined to an open end of a peripheral wall of a base formed in a bottomed container shape, the case including:
   a recess that is disposed in the peripheral wall of the base and opens to an outer surface of the peripheral wall and the open end; and
   a blocking portion that is projectingly disposed in the cover at the juncture between the cover and the base and inserted into the recess to thereby block off a portion of the recess,
   wherein the recess is disposed in a shape protruding from the peripheral wall of the base toward an inner side direction of a case width, and the blocking portion includes a blocking piece that extends out from the cover, such that the blocking piece is substantially flush with the outer surface of the peripheral wall of the base, and blocks off a portion of the recess,
   wherein ribs that extend from an inner surface of the blocking piece and abut against a bottom surface of the recess, which bottom surface is oriented in a case vertical direction, are disposed at the inner surface of the blocking piece.

6. The case of claim 4, wherein weight-reducing sections are formed in a bottom surface of the recess which bottom surface is oriented in the case width direction.

7. The case of claim 4, wherein the blocking portion is disposed to project toward the case width direction inner side so that it has a shape that covers at least the recess, and weight-reducing sections are formed between a projecting portion and the blocking piece.

8. A hollow case formed by a cover being joined to an open end of a peripheral wall of a base formed in a bottomed container shape, the case including:
   a recess that is disposed in the peripheral wall of the base and opens to an outer surface of the peripheral wall and the open end; and
   a blocking portion that is projectingly disposed in the cover at the juncture between the cover and the base and inserted into the recess to thereby block off a portion of the recess,
   wherein the recess is disposed in a shape protruding from the peripheral wall of the base toward an inner side direction of a case width, and the blocking portion includes a blocking piece that extends out from the cover, such that the blocking piece is substantially flush with the outer surface of the peripheral wall of the base, and blocks off a portion of the recess,
   wherein the blocking portion is disposed to project toward the case width direction inner side so that it has a shape that covers at least the recess, and weight-reducing sections are formed between a projecting portion and the blocking piece,
   wherein ribs that extend from an inner surface of the blocking piece to the projecting portion and abut against the projecting portion are disposed at the weight-reducing sections.

9. The case of claim 7, wherein the blocking portion is structured in a shape that substantially corresponds to the recess.

10. A hollow case formed by a cover being joined to an open end of a peripheral wall of a base formed in a bottomed container shape, the case including:
    a recess that is disposed in the peripheral wall of the base and opens to an outer surface of the peripheral wall and the open end; and
    a blocking portion that is projectingly disposed in the cover at the juncture between the cover and the base and inserted into the recess to thereby block off a portion of the recess,
    wherein the recess is disposed in a shape protruding from the peripheral wall of the base toward an inner side direction of a case width, and the blocking portion includes a blocking piece that extends out from the cover, such that the blocking piece is substantially flush with the outer surface of the peripheral wall of the base, and blocks off a portion of the recess,
    wherein the blocking portion is disposed to project toward the case width direction inner side so that it has a shape that covers at least the recess, and a notch serving as a weight-reducing section is formed in a portion of the projecting portion above the blocking piece.

11. The case of claim 10, wherein the blocking portion is structured in a shape that substantially corresponds to the recess.

12. The case of claim 4, wherein the blocking piece is structured to fit into the recess.

13. The case of claim 3, wherein a surface of the blocking portion is smoother than a surface of a peripheral wall of the cover.

14. A case including:
    a base formed in a bottomed container shape;
    a cover having a shape that can be joined to an open end of a peripheral wall of the base, so that a hollow case is formed when the cover is joined to the base;
    a recess that is disposed in the peripheral wall of the base, protrudes toward an inner side direction of a case width, and opens to the open end and outer surface of the peripheral wall; and
    a blocking portion that is projectingly disposed in the cover at the juncture between the cover and the base and inserted into the recess to thereby block off a portion of the recess, wherein the blocking portion includes a blocking piece that extends out from the cover and blocks off the portion of the recess, and wherein when the cover is joined to the base, a bottomed engagement hole, which opens only toward the case outer side surface of the peripheral wall of the base, is formed due to the blocking portion blocking off the portion of the recess.

15. A case including:

a base formed in a bottomed container shape;

a cover having a shape that can be joined to an open end of a peripheral wall of the base, so that a hollow case is formed when the cover is joined to the base;

a recess that is disposed in the peripheral wall of the base, protrudes toward an inner side direction of a case width, and opens to the open end and outer surface of the peripheral wall; and a blocking portion that is projectingly disposed in the cover at the juncture between the cover and the base and inserted into the recess to thereby block off a portion of the recess, wherein the blocking portion includes a blocking piece that extends out from the cover and blocks off the portion of the recess, wherein ribs that extend from an inner surface of the blocking piece and abut against a bottom surface of the recess, which bottom surface is oriented in a case vertical direction, are disposed at the inner surface of the blocking piece.

16. The case of claim 14, wherein the blocking piece is structured to fit into the recess.

17. The case of claim 14, wherein weight-reducing sections are formed in a bottom surface of the recess, which bottom surface is oriented in a case vertical direction.

18. The case of claim 14, wherein the blocking portion is disposed to project toward the case width direction inner side so that it has a shape that covers at least the recess at the time of joining, and weight-reducing sections are formed between a projecting portion and the blocking piece.

19. A case including:

a base formed in a bottomed container shape;

a cover having a shape that can be joined to an open end of a peripheral wall of the base, so that a hollow case is formed when the cover is joined to the base;

a recess that is disposed in the peripheral wall of the base, protrudes toward an inner side direction of a case width, and opens to the open end and outer surface of the peripheral wall; and a blocking portion that is projectingly disposed in the cover at the juncture between the cover and the base and inserted into the recess to thereby block off a portion of the recess, wherein the blocking portion includes a blocking piece that extends out from the cover and blocks off the portion of the recess, wherein the blocking portion is disposed to project toward the case width direction inner side so that it has a shape that covers at least the recess at the time of joining, and a notch serving as a weight-reducing section is formed in a portion of the projecting portion above the blocking piece.

20. The case of claim 14, wherein a surface of the blocking portion is smoother than a surface of a peripheral wall of the cover.

21. The case of claim 1, further comprising:

a plurality of recesses that are disposed in the peripheral wall of the base and open to an outer surface of the peripheral wall and the open end; and a plurality of blocking portions that are projectingly disposed in the cover at junctures between the cover and the base and inserted into the recesses to thereby block off a portion of the recesses.

22. The case of claim 1, wherein a shape of the cover is substantially the same as the shape of the base.

23. The case of claim 1, further comprising a cut out corner of the base and the cover.

* * * * *